(12) United States Patent
Sparrer

(10) Patent No.: US 10,961,901 B2
(45) Date of Patent: *Mar. 30, 2021

(54) TURBINE FOR AN EXHAUST TURBOCHARGER HAVING A TWO-VOLUTE TURBINE HOUSING AND A LINEAR VALVE FOR VOLUTE CONNECTION AND WASTEGATE CONTROL

(71) Applicant: CONTINENTAL AUTOMOTIVE GMBH, Hannover (DE)

(72) Inventor: Christoph Sparrer, Regensburg (DE)

(73) Assignee: Vitesco Technologies GmbH, Hannover (DE)

( * ) Notice: Subject to any disclaimer, the term of this patent is extended or adjusted under 35 U.S.C. 154(b) by 239 days.

This patent is subject to a terminal disclaimer.

(21) Appl. No.: 16/300,985

(22) PCT Filed: Apr. 20, 2017

(86) PCT No.: PCT/EP2017/059400
§ 371 (c)(1),
(2) Date: Nov. 13, 2018

(87) PCT Pub. No.: WO2017/194287
PCT Pub. Date: Nov. 16, 2017

(65) Prior Publication Data
US 2020/0318531 A1    Oct. 8, 2020

(30) Foreign Application Priority Data
May 12, 2016 (DE) .................... 10 2016 208 163.2

(51) Int. Cl.
*F02B 37/02* (2006.01)
*F02B 37/18* (2006.01)
(Continued)

(52) U.S. Cl.
CPC .......... *F02B 37/025* (2013.01); *F01D 17/105* (2013.01); *F02B 37/183* (2013.01);
(Continued)

(58) Field of Classification Search
CPC ...... F02B 37/225; F02B 37/025; F02B 37/18; F02B 37/183; F02B 37/186; F01D 17/105; F05D 2220/40
(Continued)

(56) References Cited

U.S. PATENT DOCUMENTS 4,530,640 A * 7/1985 MacInnes ............... F02B 37/18
60/602
4,836,342 A * 6/1989 Wolfe ........................ F16F 9/46
188/282.4
(Continued)

FOREIGN PATENT DOCUMENTS

CN    101865032 A    10/2010
CN    105339627 A    2/2016
(Continued)

*Primary Examiner* — Thai Ba Trieu
(74) *Attorney, Agent, or Firm* — Laurence A. Greenberg; Werner H. Sterner; Ralph E. Locher

(57) ABSTRACT

A turbine for an exhaust-gas turbocharger has a turbine housing formed with two volutes through which an exhaust gas can flow and which are separated by a separating wall. Only a single wastegate valve is provided for both volutes. The wastegate valve is a linear valve with a linear valve element. The linear valve element is received in the separating wall and is movably guided in its axial direction in the separating wall.

14 Claims, 19 Drawing Sheets

(51) Int. Cl.
*F02B 37/22* (2006.01)
*F01D 17/10* (2006.01)

(52) U.S. Cl.
CPC .......... *F02B 37/186* (2013.01); *F02B 37/225* (2013.01); *F05D 2220/40* (2013.01)

(58) Field of Classification Search
USPC .................................................. 60/602, 605.1
See application file for complete search history.

(56) References Cited

U.S. PATENT DOCUMENTS

| | | | |
|---|---|---|---|
| 6,250,079 B1 | 6/2001 | Zander et al. | |
| 8,585,355 B2 | 11/2013 | Henderson et al. | |
| 9,506,398 B2 | 11/2016 | Dusik et al. | |
| 9,726,081 B2 | 8/2017 | Zahoransky et al. | |
| 9,856,784 B2 | 1/2018 | Kronschnabl et al. | |
| 10,683,795 B2 * | 6/2020 | Sparrer | F02B 37/186 |
| 2014/0230432 A1 | 8/2014 | Kindl et al. | |
| 2014/0345273 A1 * | 11/2014 | Yamaguchi | F02B 37/183 60/602 |
| 2015/0033733 A1 | 2/2015 | Dusik et al. | |
| 2015/0098803 A1 | 4/2015 | Kronschnabl et al. | |
| 2016/0201683 A1 * | 7/2016 | Kares | F04D 17/12 415/199.2 |
| 2017/0350312 A1 | 12/2017 | Karstadt et al. | |
| 2017/0370279 A1 * | 12/2017 | Stilgenbauer | F02B 37/183 |

FOREIGN PATENT DOCUMENTS

| | | | |
|---|---|---|---|
| DE | 69814660 T2 | 4/2004 | |
| DE | 102010008411 A1 | 8/2011 | |
| DE | 202013100774 U1 | 5/2013 | |
| DE | 102011089777 A1 | 6/2013 | |
| DE | 102013002894 A1 | 9/2014 | |
| DE | 202014009873 U1 | 4/2016 | |
| DE | 102015105218 A1 | 10/2016 | |
| JP | 2006316658 A * | 11/2006 | |
| JP | 2006348894 A * | 12/2006 | ............ F02B 37/025 |
| WO | 2013135548 A1 | 9/2013 | |
| WO | 2013139762 A1 | 9/2013 | |
| WO | 2015009697 A1 | 1/2015 | |
| WO | 2016094265 A1 | 6/2016 | |

* cited by examiner

FIG 3
PRIOR ART
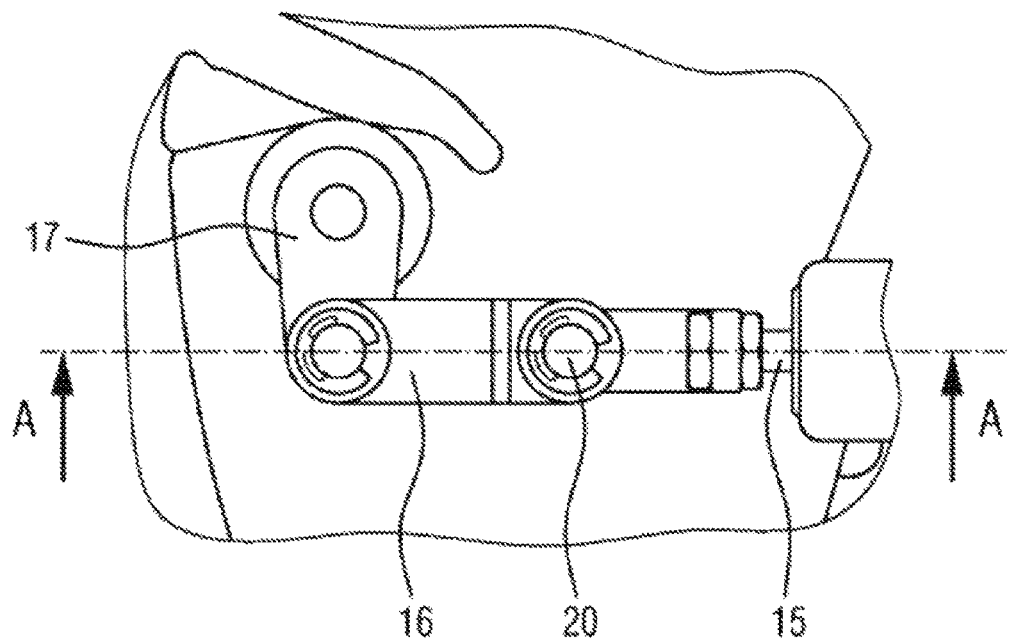
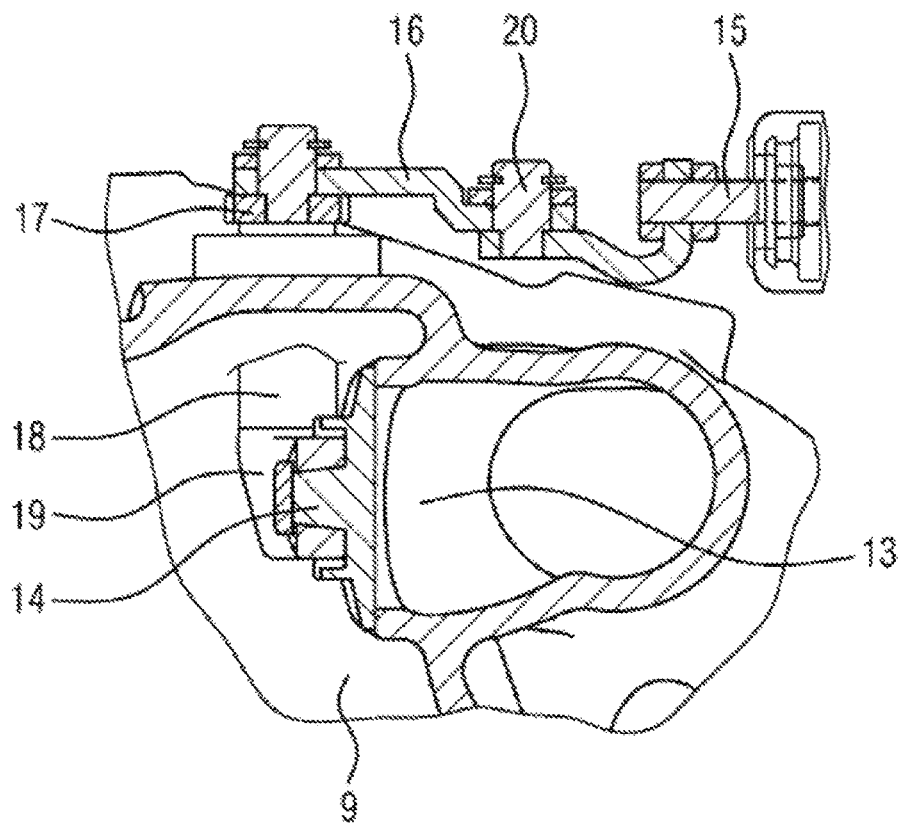

A-A

B-B

A-A

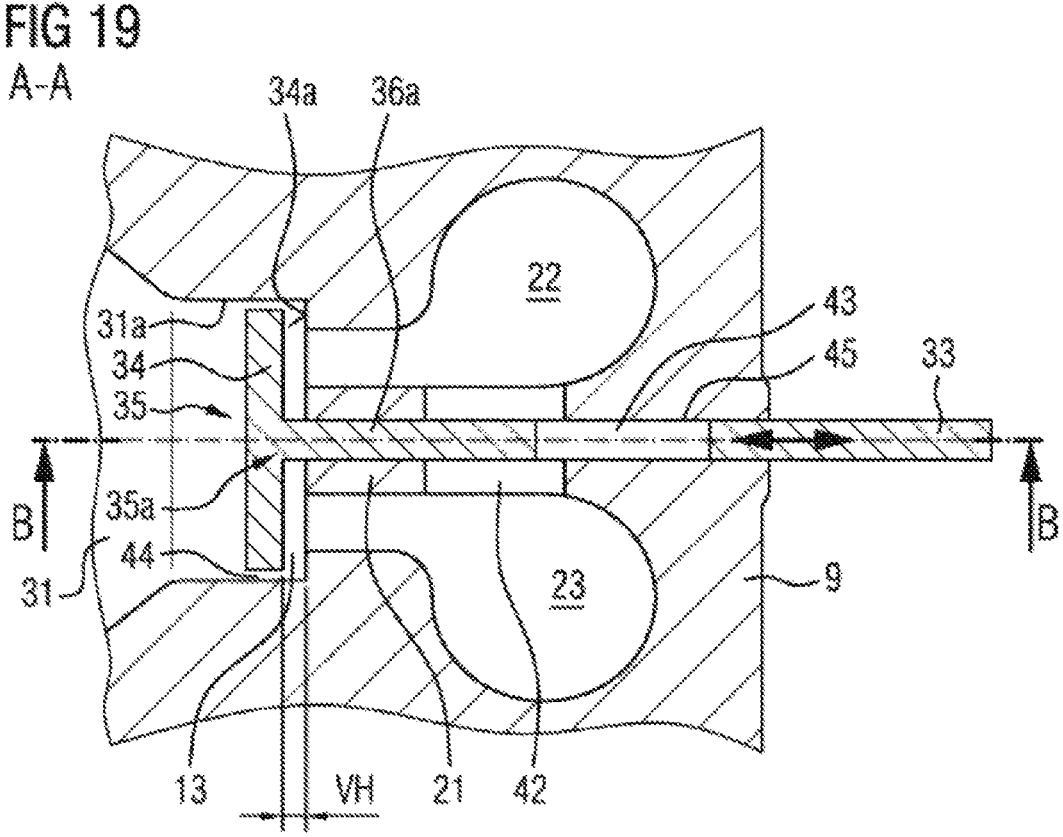
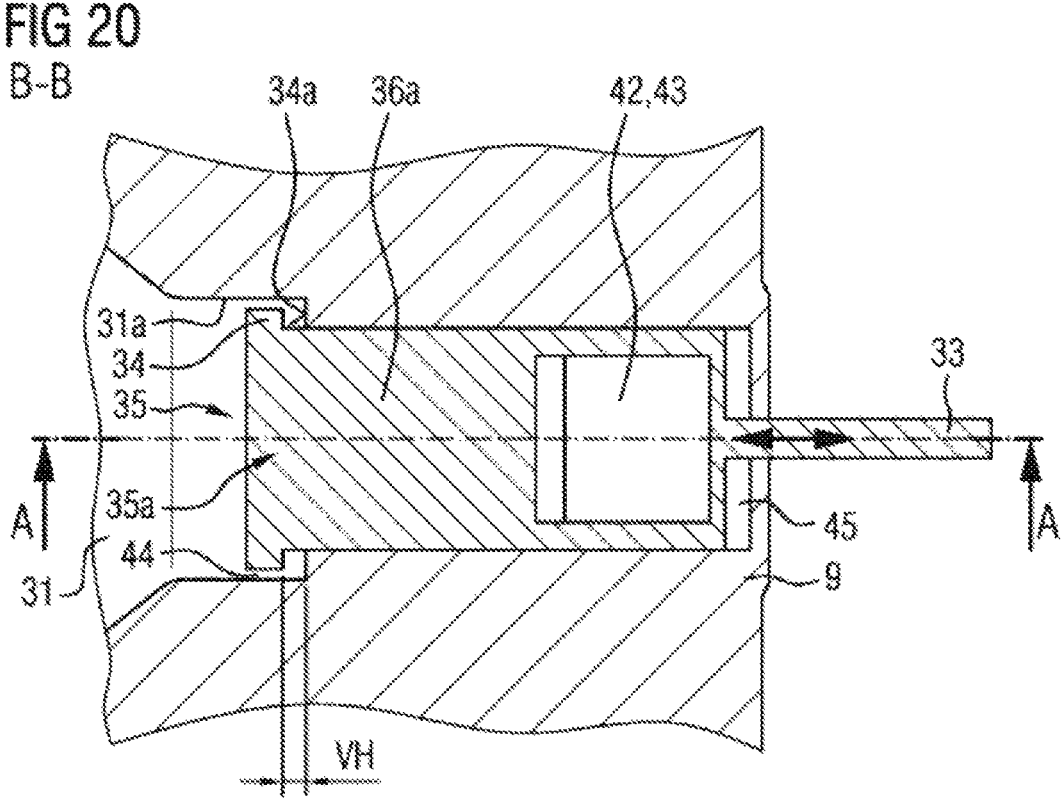

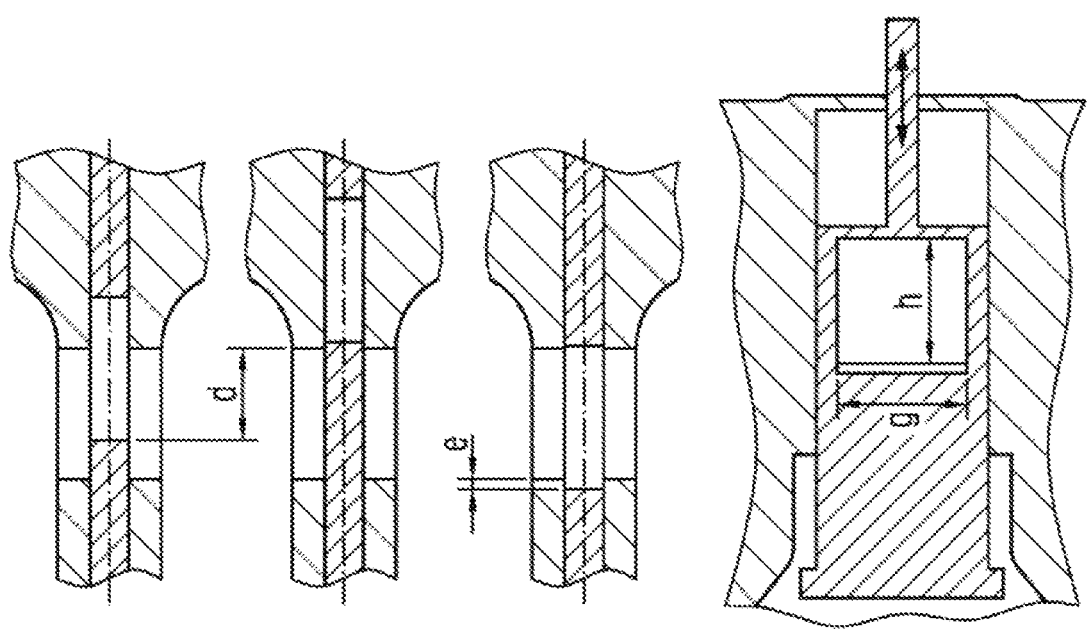
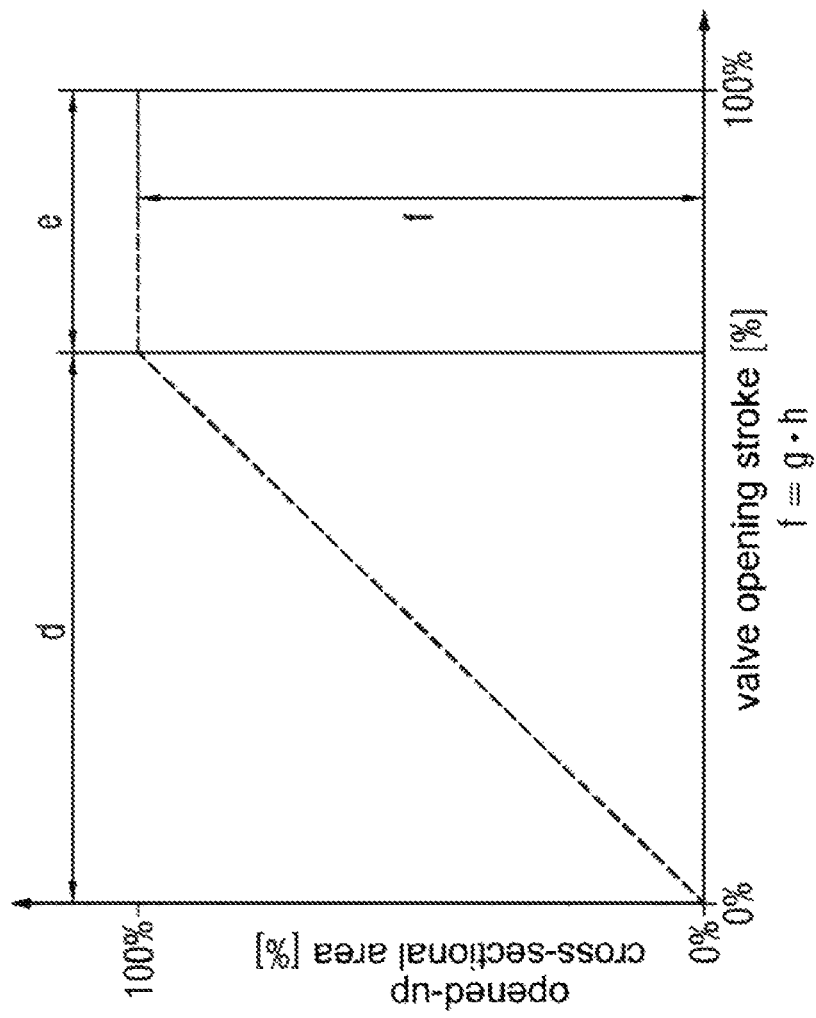
FIG 22

A-A

TURBINE FOR AN EXHAUST TURBOCHARGER HAVING A TWO-VOLUTE TURBINE HOUSING AND A LINEAR VALVE FOR VOLUTE CONNECTION AND WASTEGATE CONTROL

BACKGROUND OF THE INVENTION

Field of the Invention

The invention relates to a turbine for an exhaust-gas turbocharger with a two-volute turbine housing and with a linear valve for volute connection and wastegate control.

An internal combustion engine 1 which is supercharged by an exhaust-gas turbocharger 2 is characterized by the arrangement of the guidance of fresh air and exhaust gases as illustrated in FIG. 1. During supercharged operation, the exhaust gas flows from the internal combustion engine 1 via the turbine 3, which drives the compressor 4 in the intake tract upstream of the inlet of the engine 1 via a common shaft 5. As a result of the compression of the intake air, more fuel can be admixed per cylinder stroke, and the torque of the engine 1 is increased.

For the sake of clarity, some elements of the air-guiding arrangement are not illustrated in FIG. 1. These are for example an air filter arranged upstream of the compressor, an air flow sensor arranged upstream of the compressor, a charge-air cooler arranged downstream of the compressor, a tank, a crankcase ventilation means arranged downstream of the throttle flap, and a catalytic converter arranged downstream of the turbine. An exhaust-gas recirculation arrangement that may be provided, or secondary air injection means, have likewise not been illustrated.

During supercharged operation, the throttle flap 8 is fully open. The closed-loop control of the supercharging may be effected for example by virtue of a part of the exhaust-gas mass flow being blown off through a wastegate system 7. Furthermore, on the compressor side, there is arranged a so-called overrun air recirculation system 6, via which excess compressed intake air can be blown off and recirculated into the intake tract.

FIG. 2 illustrates a possible embodiment of an exhaust-gas turbocharger 2 according to the prior art. This illustration includes a section in the region of the wastegate system. The wastegate system 7 is arranged in the turbine housing 9. The wastegate system 7 is actuated by means of a wastegate actuator 10 which is fastened to the compressor housing 11 using a holder. Between the turbine housing 9 and the compressor housing 11, there is situated a body assembly 12 in which the common shaft of turbine wheel and compressor wheel is accommodated.

FIG. 3 shows the wastegate system in a plan view and in a sectional illustration of the side view. The illustration shows the wastegate opening 13 in the turbine housing 9, which can be opened up or closed off by means of a wastegate flap disk 14. Thus, a part of the exhaust-gas mass flow can be conducted past the turbine impeller as required. The opening and closing actuation of the flap 14 is performed by means of a linear movement of a control rod 15 which is controlled by a pneumatic or electric actuator. This linear movement is transmitted via a connecting plate 16 to an outer wastegate lever 17. The wastegate spindle 19 mounted in a bushing 18 transmits the rotational movement to the wastegate flap disk 14. Owing to the linearly guided control rod 15, a compensation joint 20 is additionally required in the kinematic arrangement in order to ensure a compensation of an offset.

The above embodiments relate to exhaust-gas turbochargers with a single-volute turbine housing. These are also referred to as monoscroll turbines. This technology has the disadvantage that the individual cylinders of the internal combustion engine adversely affect one another during a charge exchange. This has an adverse effect on the exhaust-gas back pressure and the gas exchange of the engine, whereby, in turn, the consumption, response behavior and nominal power thereof are impaired.

To eliminate this problem, two-volute turbine housings are used. Here, a distinction is made between segmented-scroll turbines and twin-scroll turbines, as illustrated in FIG. 4.

Both turbines comprise a separating wall 21, which is provided between the two volutes 22 and 23. In the case of the segmented-scroll turbine (left-hand image), the separating wall is arranged such that the impeller is impinged on from both volutes over in each case 180° over the full impeller inlet width. In the case of the twin-scroll turbine (right-hand image), the separating wall is arranged in the radial direction with respect to the turbine impeller, whereby the turbine impeller is impinged on from both volutes over 360° over in each case 50% of the impeller inlet width. In both turbine construction types, use is made, as can be seen from FIG. 5, of an exhaust-gas manifold 24 in which, in the case of four-cylinder engines, in each case two cylinders, and in the case of six-cylinder engines, in each case three cylinders, are combined to form a tract. Each tract is in turn connected to one volute of the two-volute turbine housing. It is ensured in this way that the exhaust-gas pulses of the individual cylinders have the least possible adverse effect. FIG. 5 illustrates the exhaust-gas manifold of a four-cylinder engine, in the case of which in each case two cylinders are combined to form a tract. Thus, the exhaust-gas lines 26 and 29 of the first and of the fourth cylinder are combined to form a tract. Furthermore, the exhaust-gas lines 27 and 28 of the second and of the third cylinder are combined to form a tract. The exhaust-gas flows 25 are indicated by corresponding arrows.

As in the case of monoscroll turbines, closed-loop charge-pressure control is realized in the case of exhaust-gas turbochargers with two-volute turbines by virtue of excess exhaust gases being blown off via a wastegate valve. For a further reduction of the charge exchange losses in exhaust-gas turbochargers with two-volute turbine housings, a switchable volute connection is advantageous. As in the case of the wastegate valve, this involves a valve which permits a transfer flow of exhaust gas from volute to volute as required. The use of a second valve however has an adverse effect on the costs and the structural space of the exhaust-gas turbocharger.

To avoid these disadvantages, it is already known for the functionalities of wastegate and volute connection to be realized using a single valve.

One possible embodiment of a wastegate valve of the type for a two-volute turbine is illustrated in FIG. 6. The illustration shows the two volutes 22 and 23 of the turbine housing 9 and the two wastegate outlets 30. Both the volutes and the wastegate outlets are separated from one another by a separating wall 21. It is thus possible for both volutes to be actuated by means of a common wastegate valve 32, wherein, when the wastegate valve is opened, the two volutes 22 and 23 are also fluidically connected to one another via the wastegate outlets 30. For the displacement of the wastegate valve, a displacement arm 33 is provided, which is actuated in rotation. The main function of this embodiment is regulation of the wastegate mass flow of both volutes using one valve.

DE 10 2013 002 894 A1 and DE 10 2010 008 411 A1 have each disclosed a turbine for an exhaust-gas turbocharger, which turbine has a turbine housing in which two volutes through which exhaust gas can flow are provided, which turbine housing furthermore has a bypass channel. Furthermore, in each case, a valve is provided which, in the closed state, shuts off both the volute connection and the bypass channel and, in the open state, opens both the volute connection and the bypass channel. These valves are movable in translational or rotational fashion. In the case of rotational actuation, the valve has a pivot arm which is pivotable about a center of rotation and to the end region of which there is fastened a flap disk and which, in the case of DE 10 2013 002 894 A1, is supplemented by a spherical-segment-shaped body.

In the case of such a rotationally pivotable pivot arm being used, there is limited freedom for the design of a possibly provided valve body 36 which protrudes into the wastegate opening. This will be discussed on the basis of FIGS. 7 and 8, which illustrate the movement of a valve body 36. From these figures, it is clear that the movement of the valve body 36 is limited by a circle (illustrated by dashed lines). Consequently, the outer contour of the valve body 36 must be selected such that the valve body 36, during this movement, does not cross the circular line toward the outside. This has the disadvantage, for example, that the shape of the valve body 36 cannot be cylindrical.

In the case of DE 10 2010 008 411 A1, in one exemplary embodiment, a translationally adjustable valve is provided between the volutes and the bypass, which valve has a shaft, a cover and a flap disk. In a first position of this valve, the volutes are fluidically separated from one another, and the bypass is closed. In a second position of this valve, the volutes are fluidically connected to one another, and the bypass is closed. In a third position of this valve, the volutes are fluidically connected to one another, and the bypass is open. The known wastegate valves that are actuated in translation have the disadvantage that an actuating shaft which is required must be guided in the housing over a certain length, which generally necessitates an extensive construction.

SUMMARY OF THE INVENTION

It is the object of the invention to specify a turbine for an exhaust-gas turbocharger having a two-volute housing and having a linear valve, the manner of operation of which is improved and the space requirement of which is reduced.

This object is achieved by means of a turbine having the features specified in claim 1. Advantageous embodiments and refinements of the invention are specified in the dependent claims.

Accordingly, a turbine for an exhaust-gas turbocharger is proposed, having a turbine housing which has two volutes through which an exhaust gas can flow and between which there is provided a separating wall. The turbine has only one wastegate valve, designed as a linear valve, for both volutes, which wastegate valve has a linear valve element for opening and closing wastegate outlets of the two volutes in the direction of a common outlet chamber arranged outside the volutes, wherein the linear valve element is connected to a displacement shaft, which has a shaft longitudinal axis, for actuating the linear valve element. The turbine is characterized in that the displacement shaft is guided out of the turbine housing through the separating wall in the direction of a separating wall plane spanned by the separating wall, and is arranged so as to be guided movably in the direction of its shaft longitudinal axis in the separating wall (21), wherein the linear valve element is, in order to close the wastegate outlets, guided from the direction of the outlet funnel toward a valve seat and can, in order to open the wastegate outlets, be lifted off from the valve seat in the axial direction, that is to say in a rectilinear movement along the shaft longitudinal axis, into the outlet chamber by means of the displacement shaft. In general, the outlet chamber is directly connected to an exhaust-gas system for discharging the exhaust gas.

The advantages of a turbine having the features as claimed consist in particular in that, during the operation of the turbine, owing to the guidance of the linear valve element in the separating wall between the two volutes, exact guidance of the linear valve element is ensured, along with a simultaneously very space-saving arrangement. By means of the exact guidance of the displacement arm of the valve within the separating wall between the two volutes, it is ensured that the valve disk, in a first valve position, lies exactly on its seat, such that the volutes are reliably and completely fluidically separated from one another, and that, in the second valve position, the valve is fully open. The considerably reduced space requirement is achieved by virtue of the linear valve element being guided at least partially within the separating wall, which is provided in any case in two-volute turbines, of the turbine housing. Further advantageous refinements and embodiments of a turbine having the features according to the invention, according to the subclaims, will emerge from the following description of exemplary embodiments of the invention on the basis of FIGS. 9 to 27.

BRIEF DESCRIPTION OF THE SEVERAL VIEWS OF THE DRAWING

FIGS. 2-8 show various details of the exhaust gas turbine;

FIG. 19 shows a sectional illustration for illustrating a fourth exemplary embodiment of the invention, FIG. 20 shows a further sectional illustration of the fourth exemplary embodiment along the section line B-B shown in FIG. 19, FIG. 22 shows an illustration for illustrating the cross-sectional area profile of the volute connection cross section in dependence on the valve opening stroke of the linear valve element.

DESCRIPTION OF THE INVENTION

Figure 1:
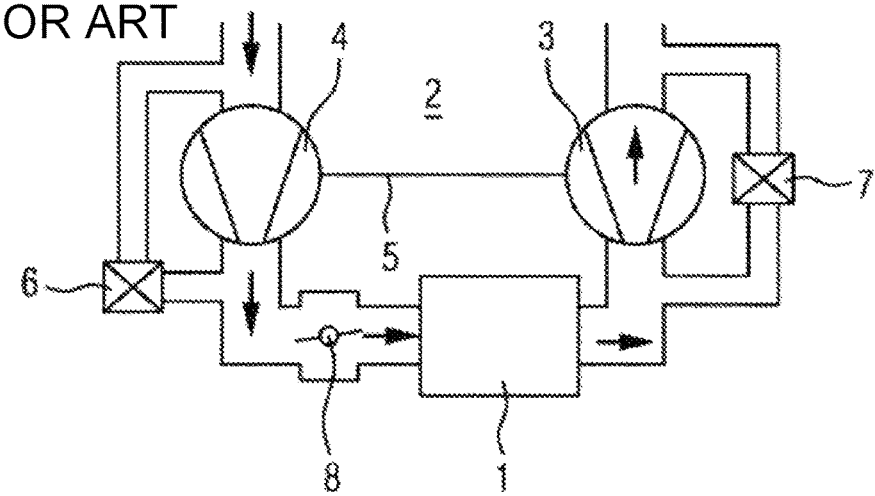
FIG. 1 shows a schematic diagram of an internal combustion engine with an exhaust gas turbine arrangement.
Figure 2:
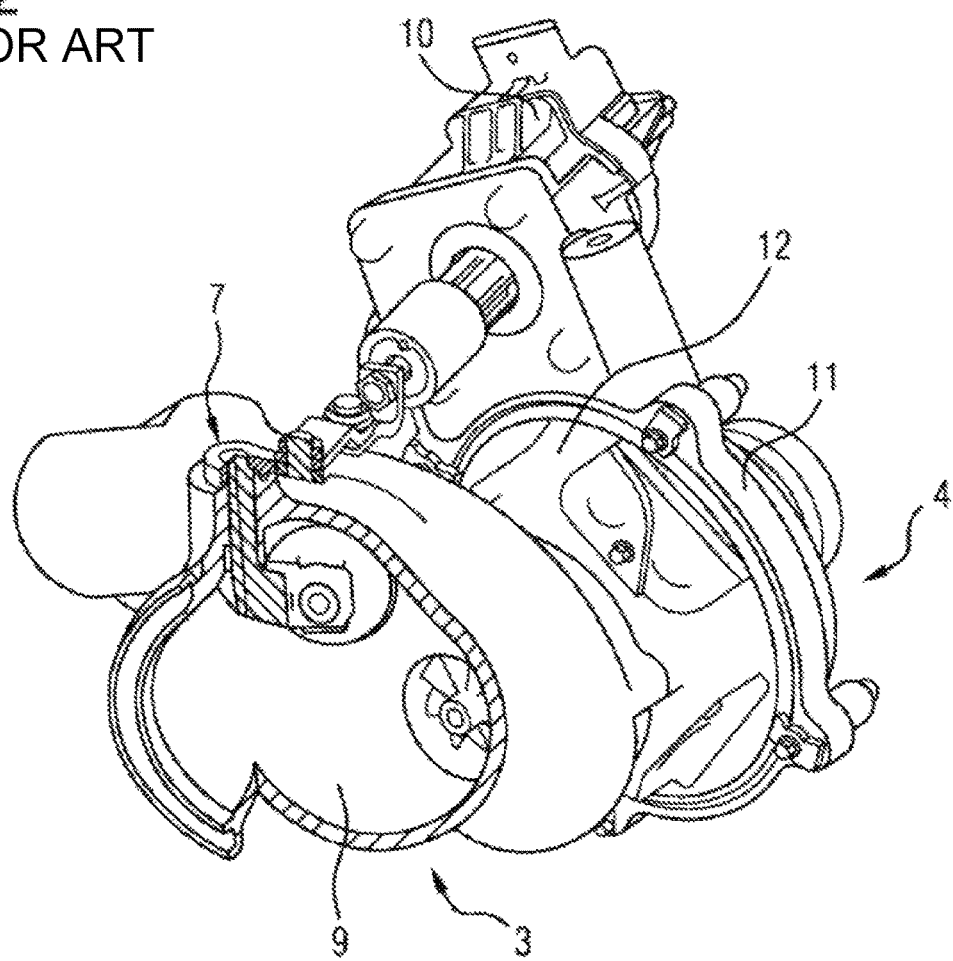
Figure 4:
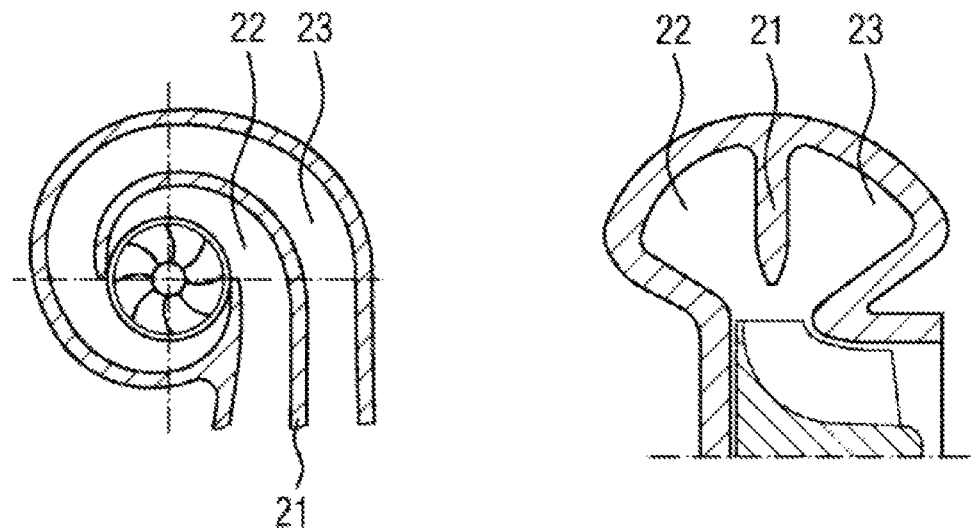
Figure 5:
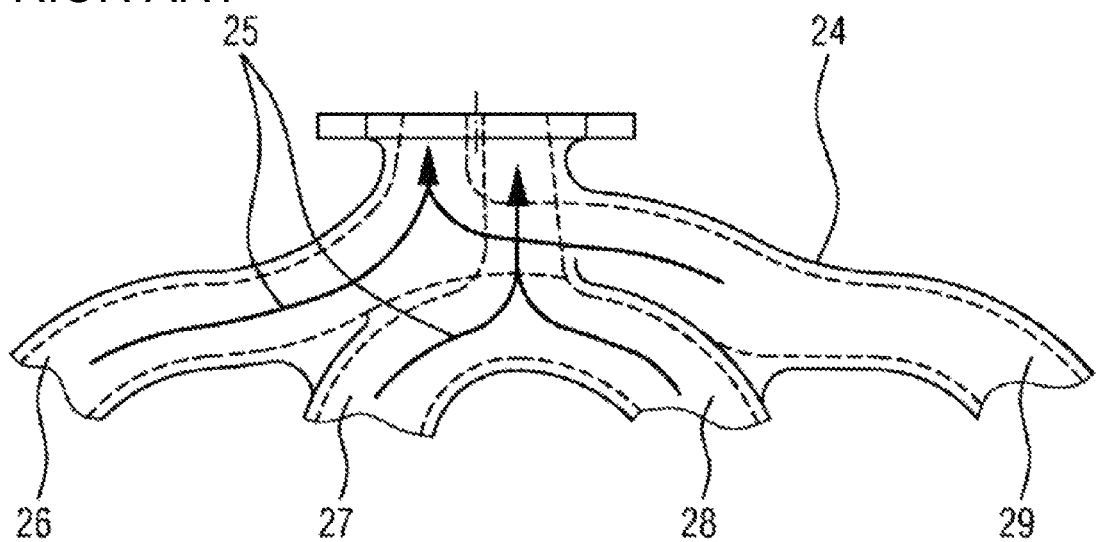
Figure 6:
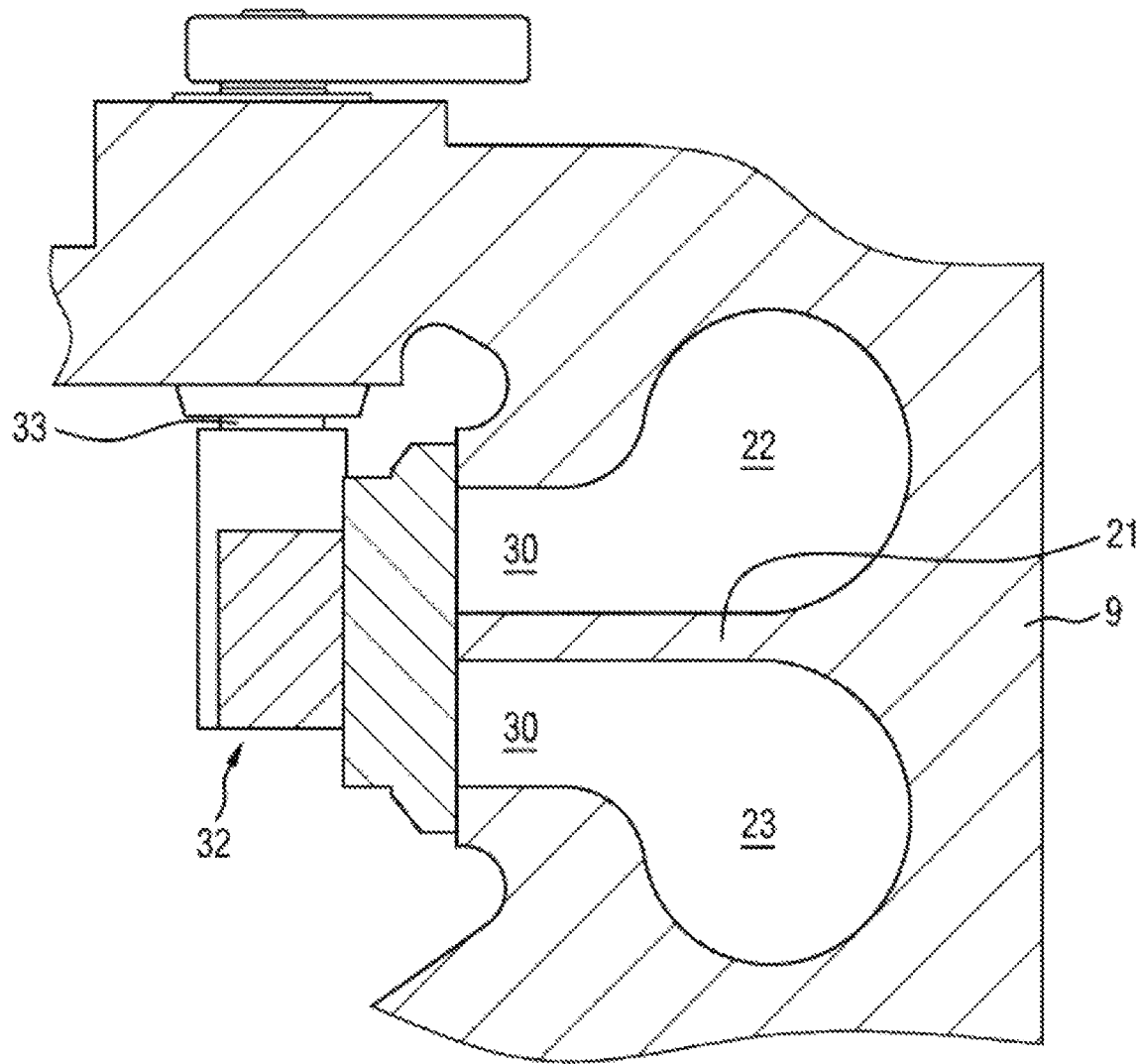
Figure 7:
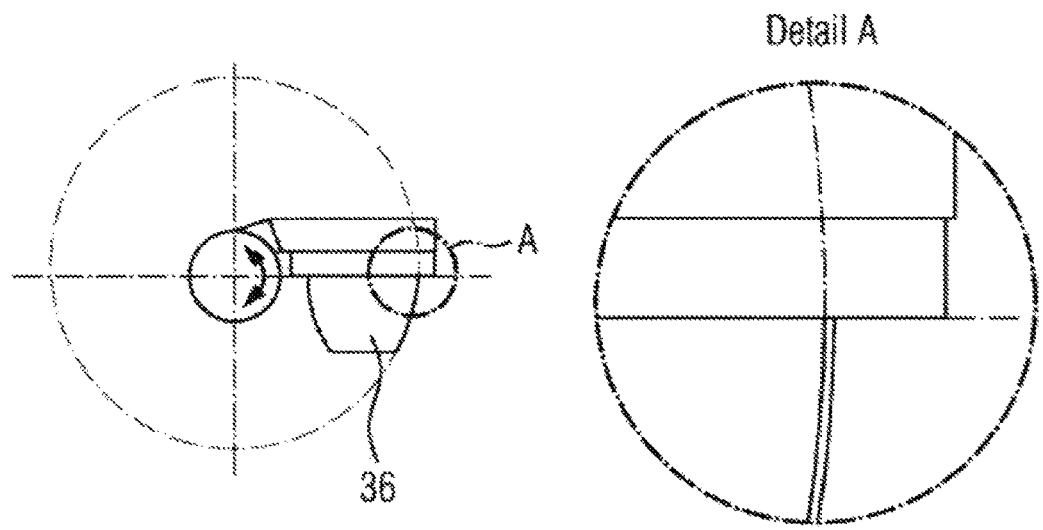
Figure 8:
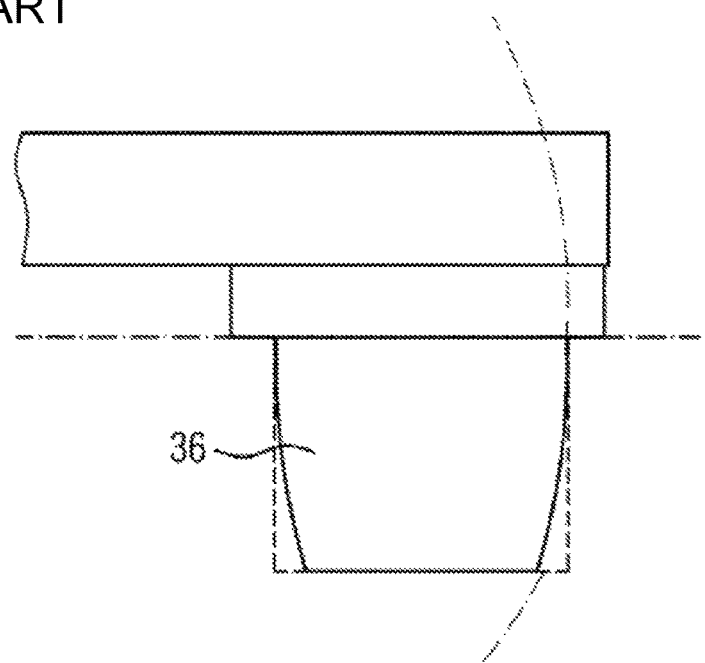

Items of identical function and designation are denoted by the same reference designations throughout the figures. The illustrated subjects are to be understood as examples of various embodiments or refinements thereof, and are not intended to rule out further alternative designs in accordance with the definition of the claims.

The present invention provides a turbine for an exhaust-gas turbocharger, which turbine has a turbine housing which comprises two volutes through which an exhaust gas can flow and between which there is provided a separating wall. Furthermore, a wastegate valve designed as a linear valve is provided, which has a linear valve element. The linear valve element is connected to a displacement shaft 33, which has a shaft longitudinal axis 33a, for the actuation of the linear valve element 35a. The displacement shaft 33 is guided out of the turbine housing 9 through the separating wall 21 in the direction of a separating wall plane spanned by the separating wall, and is arranged so as to be guided movably in the axial direction of its shaft longitudinal axis 33a in the separating wall 21. The linear valve element 35a is, in order to close the wastegate outlets 30, guided from the direction of the outlet chamber 31, that is to say from outside the volutes 22, 23, toward a valve seat 34a and can, in order to open the wastegate outlets 30, be lifted off from the valve seat in the axial direction of the shaft longitudinal axis 33a into the outlet chamber 31 by means of the displacement shaft 33. Here, and below, the expression "linear valve" is to be understood to mean a valve which is in particular characterized in that the valve element, in this case therefore referred to as linear valve element, predefines a rectilinear translational actuating movement.

Figure 9:
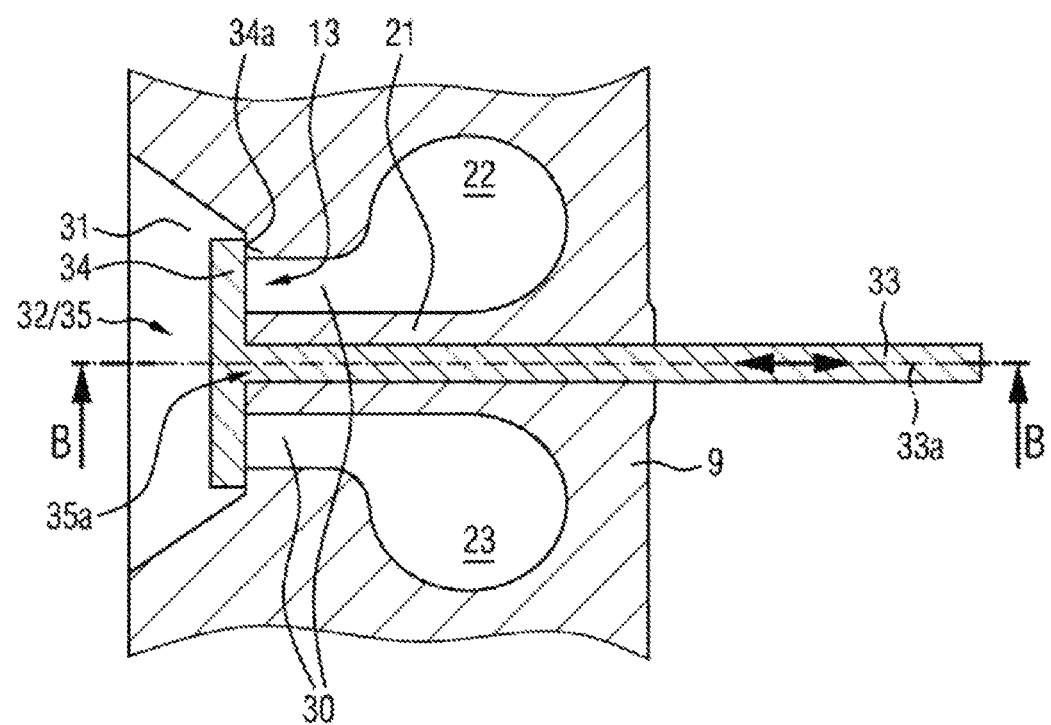
FIG. 9 shows a sectional illustration for illustrating a first exemplary embodiment of the invention.

FIG. 9 shows a sectional illustration for illustrating a first exemplary embodiment of the invention. In this first exemplary embodiment, two volutes 22 and 23 through which an exhaust gas can flow are provided in the turbine housing 9. A separating wall 21 is situated between these two volutes. Furthermore, in the turbine housing 9, in each case one wastegate outlet 30 is provided for each volute, which wastegate outlets are combined in one common wastegate opening and open into one outlet chamber 31. The wastegate valve 32 is designed as a linear valve 35, which has a linear valve element 35a. In the exemplary embodiment shown, a linear valve element 35a is provided which selectively closes or opens the wastegate valve 32. The linear valve element 35a includes a valve disk 34 of plate-like form and a displacement shaft 33 which is fixedly connected to or formed in one piece with the valve disk. The displacement shaft 33 is guided out of the turbine housing 9 in the separating wall plane through the and in the separating wall 21 of the turbine housing 9, and is guided movably in its axial direction, that is to say in a rectilinear movement along the shaft longitudinal axis 33a, within the separating wall 21, as illustrated by the bidirectional arrow in FIG. 9.

FIG. 9 illustrates a wastegate valve 32 designed as a linear valve 35 in its closed position, in which the two volutes 22 and 23 are fluidically separated from one another and the wastegate opening 13 which opens into the outlet chamber 31, and thus the wastegate outlets 30, are closed.

If the displacement shaft 33 is moved to the left in FIG. 9 by means of a wastegate actuator (not illustrated here), then the valve disk 34 fixedly connected to the displacement shaft 33 is also moved to the left, such that the valve disk is lifted off from the valve seat 34a into the outlet chamber 31, and the wastegate opening 13 and thus the wastegate valve 32 are opened. In this open position of the wastegate valve 32, the two volutes 22 and 23 are fluidically connected to one another via the outlet chamber 31, and the two wastegate outlets 30 are open. Consequently, a part of the exhaust gas flows past the turbine impeller through the wastegate valve 32, which opens into the outlet chamber 31.

Accordingly, in the exemplary embodiment shown in FIG. 9, the fluidic connection of the two volutes 22, 23 and the opening of the wastegate valve 32 are effected not by rotation using a flap, but rather by translation using a linear valve 35, which involves a linear slide. Here, the displacement shaft 33 of the linear valve 35 is guided, centrally in relation to the wastegate outlets 30, through the separating wall 21 between the two volutes 22 and 23 and through the two wastegate outlets 30 and out of the turbine housing 9. The bore through which the displacement shaft 33 is guided preferably runs centrally through the separating wall 21 in the separating wall plane. This guidance of the displacement shaft 33 in the separating wall 21 ensures reliable guidance of the displacement shaft 33 and permits substantially play-free setting both of the closed position of the linear valve 35 and a uniform opening of the linear valve 35, wherein those regions of the valve disk 34 which lie on the valve seat 34a in the closed position are lifted off from the valve seat 34a simultaneously and thus in a manner free from play.

In summary, FIG. 9 discloses a turbine 3 for an exhaust-gas turbocharger 2 as described above, which turbine is characterized in that the wastegate valve 32 has only one wastegate opening 13, in which the wastegate outlets 30 of the two volutes 22, 23 are combined, wherein the wastegate opening 13 is closed in a first valve position by the linear valve element 35a and is open at least in a second valve position of the linear valve element 35a. Here, the linear valve element 35a is connected to a displacement shaft 33 which is guided out of the turbine housing 9 through the separating wall 21 in the direction of the separating wall plane and is movable in the axial direction. Here, the linear valve element 35a is guided from the direction of the outlet chamber 31 toward a valve seat 34a and can be lifted off from the valve seat in the axial direction into the outlet chamber 31 in order to open the wastegate outlets 30.

Here, said turbine is furthermore characterized in that the linear valve element 35a, in the first valve position, when the wastegate valve 32 is closed, also keeps the two volutes 22, 23 fluidically separate from one another, and has at least one further valve position, in which a fluidic connection of the two volutes 22, 23 to one another, in this case for example via the outlet chamber 31, is opened up by the linear valve element 35a.

Furthermore, the turbine is characterized in that the linear valve element 35a has at least one valve disk 34 which, in order to close the wastegate opening 13 by sealed abutment of the valve disk 34 on a valve seat 34a surrounding the wastegate opening 13, and has a displacement shaft 33 for actuating the linear valve element 35a by axial displacement, wherein the valve disk is guided from the direction of the outlet chamber 31 toward the valve seat 34a.

Figure 10:
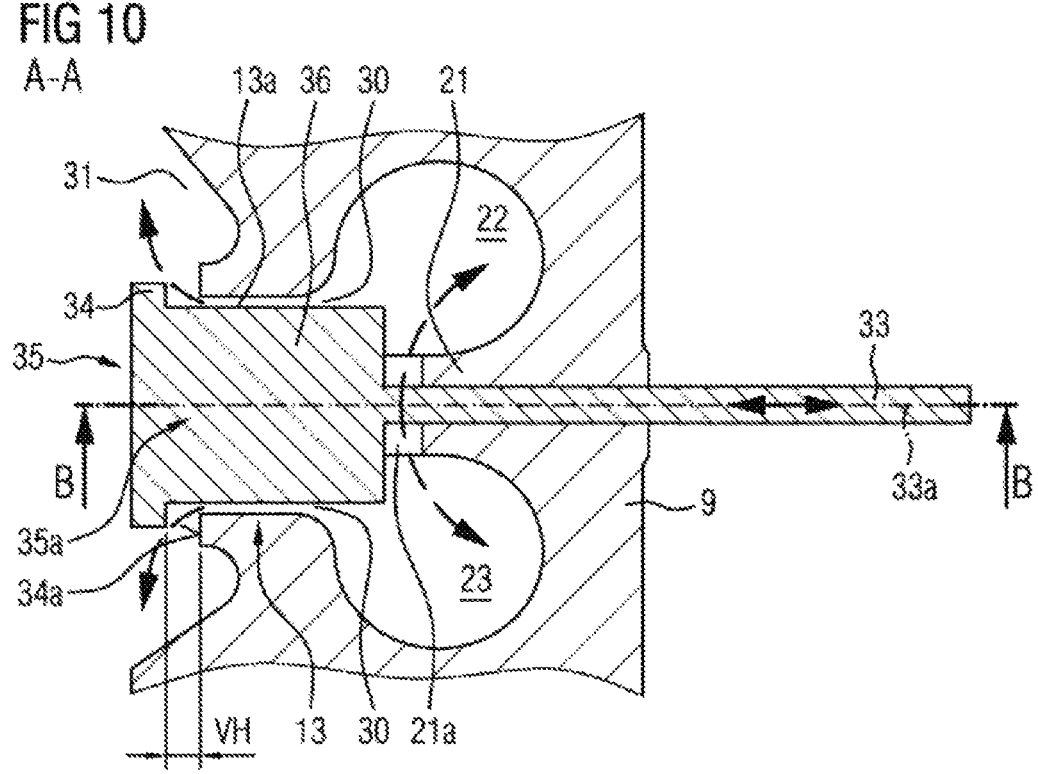
FIG. 10 shows a sectional illustration for illustrating a second exemplary embodiment of the invention.

FIG. 10 shows a sectional illustration through the valve arrangement transversely with respect to the volutes 22, 23 for the purposes of illustrating a further exemplary embodiment of the turbine according to the invention. In this exemplary embodiment, too, two volutes 22 and 23 through which an exhaust gas can flow are provided in the turbine housing 9. Between these two volutes, there is situated a separating wall 21 which has a separating wall recess 21a for receiving a valve body 36. Furthermore, in the turbine housing 9, there are provided wastegate outlets 30 which, in the region of the separating wall recess 21a of the separating wall 21, transition into a common wastegate opening 13 and are thus combined therein. Furthermore, in this exemplary embodiment too, a linear valve 35 with a linear valve element 35a is provided. The linear valve element 35a includes a valve disk 34, a displacement shaft 33 and a valve body 36 which is arranged between the valve disk 34 and the displacement shaft 33 in a separating wall recess 21a of the separating wall 21 and at the same time centrally in the wastegate opening 13. Here, a wastegate opening cross section, that is to say an opened-up cross section, through which exhaust gas can flow out of the wastegate opening 13 is defined by a valve gap 13a formed between the outer circumference of the valve body 36 and inner circumference of the wastegate opening 13. At the same time, a volute connection cross section, that is to say an opened-up cross section of the volute connection through which exhaust gas can be exchanged between the volutes, is defined by the opening-up of the separating wall recess 21a by the valve body 36, which opening-up is dependent on the valve opening stroke VH.

The displacement shaft 33 is guided through the separating wall 21 of the turbine housing 9 and is movable in its axial direction within the separating wall 21, as illustrated by the bidirectional arrow in FIG. 10. The diameter, extending transversely with respect to the shaft longitudinal axis 33a of the displacement shaft 33, of the valve body 36 is greater than the diameter of the displacement shaft 33 and at the same time smaller than the cross section, likewise extending transversely with respect to the shaft longitudinal axis 33a, of the valve disk 34.

The valve disk 34, the valve body 36 and the displacement shaft 33 may be realized in the form of a linear valve element 35a integrated in one piece. As an alternative to this, the components may also be individual components which are connected to one another by assembly, for example by welding.

In this example, the valve body 36 is of cylindrical design with a constant diameter, has a smaller diameter than the wastegate opening 13 in which it is arranged, and extends in the wastegate opening 13 and in the separating wall recess 21a of the separating wall 21 over a certain predefined axial length, such that a valve gap 13a is formed between valve body 36 and wastegate opening 13.

Figure 11:
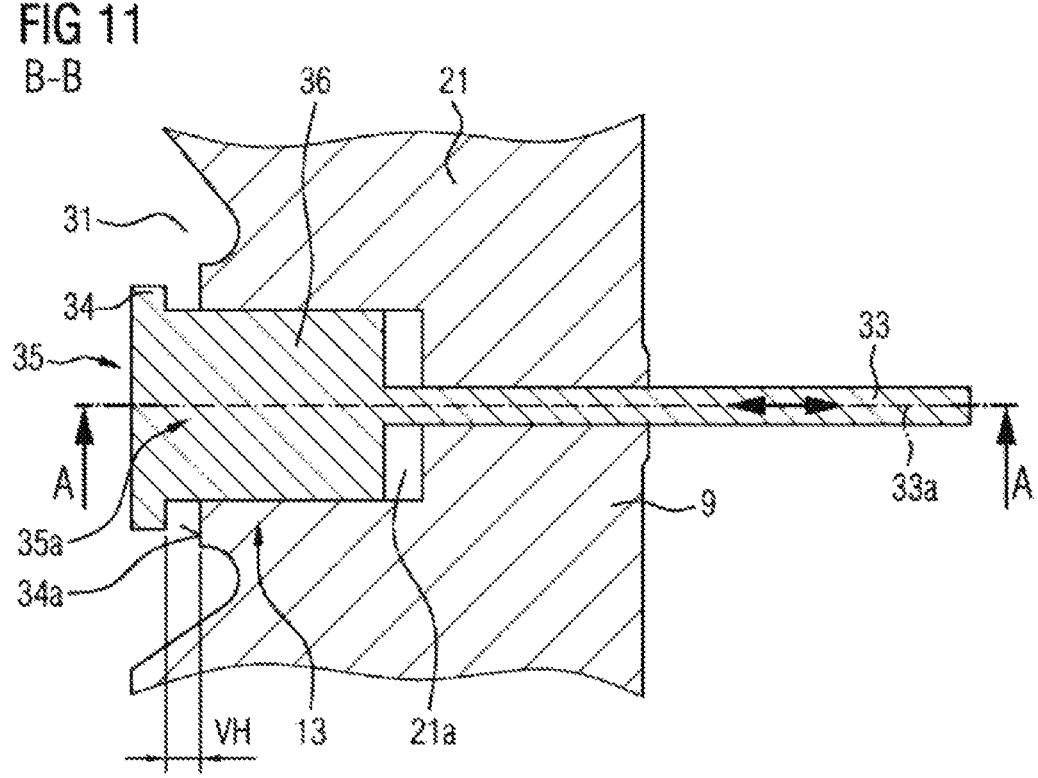
FIG. 11 shows a further sectional illustration of the second exemplary embodiment along the section line B-B shown in FIG. 10.

At the same time, the recess 21a of the separating wall 21 is designed to terminate in as sealed a manner as possible along the longitudinal side of the valve body 36, as can be seen in FIG. 11, which shows a sectional illustration of the valve arrangement in the direction of the separating wall.

In the closed state of the linear valve 35 (not illustrated), the valve disk 34 is seated on the valve seat 34a surrounding the wastegate opening 13, and thus closes the wastegate opening 13 and thus the wastegate outlets 30 of the two volutes 22, 23 in a sealed manner. At the same time, the axial extent of the valve body 36 is defined such that, on its end side facing toward the displacement shaft 33, it sets down on the base of the recess 21a in the separating wall 21 and thus closes off the recess 21a and separates the two volutes 22, 23 from one another.

This embodiment is particularly advantageous because, during an opening of the linear valve, that is to say as the valve disk 34 lifts off from the valve seat 34a, initially only the valve gap 13a, as a predefined small wastegate opening cross section, is opened up. During a further opening of the linear valve, the opened-up wastegate opening cross section initially remains constant owing to the axial extent of the valve body 36 with unchanging cross section of the valve gap 13a between the wastegate opening 13 of the turbine housing 9 and the valve body 36. Only when the valve body 36 has been pushed all the way, that is to say beyond its axial extent, out of the wastegate opening 13 of the turbine housing 9 is the opened-up wastegate cross section abruptly increased in size.

With the lifting-off of the valve disk 34 from the valve seat 34a, a volute connection cross section is also opened at the base of the recess 21a. The volute connection cross section increases linearly with the opening stroke of the linear valve.

A further embodiment of the turbine according to the invention is characterized in that the valve body 36 is designed such that, proceeding from the first, closed valve position of the linear valve element 35a, in the case of a continuously increasing valve opening stroke VH of the linear valve element 35a by means of axial displacement of the displacement shaft 33, the wastegate opening cross section is initially increased linearly, is then kept constant over a certain extent of the valve opening stroke VH, and is then linearly increased again, until a valve end position is reached.

In a further development of the above-stated exemplary embodiment, the turbine is characterized in that the valve body 36 is designed such that, proceeding from the first, closed valve position of the linear valve element 35a, in the case of a continuously increasing valve opening stroke VH of the linear valve element 35 by means of axial displacement of the displacement shaft 33, the volute connection cross section is increased continuously throughout until a maximum volute connection cross section is reached, and then remains constant until a valve end position is reached.

Figure 12:
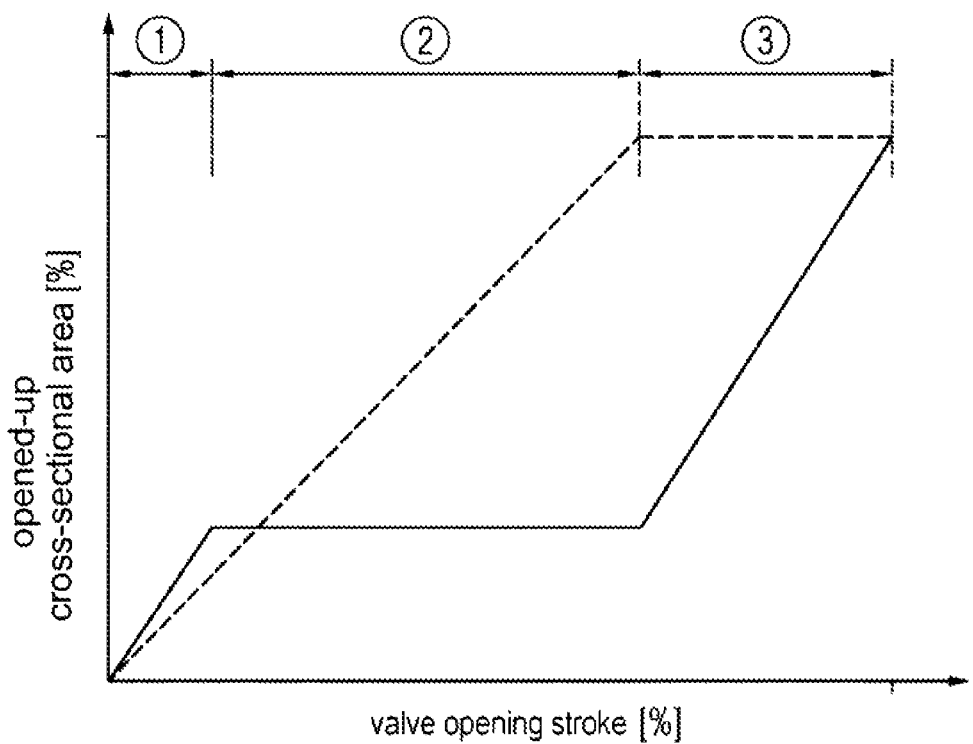
FIG. 12 shows a diagram for illustrating a first example of a preferred cross-sectional area profile of wastegate opening cross section and volute connection cross section.

An area profile, sought with the above-stated arrangement, of opened-up cross-sectional areas of the wastegate opening cross section and of the volute connection cross section in relation to the valve opening stroke is illustrated in FIG. 12. The figure shows a diagram for illustrating a first example of a preferred cross-sectional area profile, over the valve opening stroke, of opened-up wastegate opening cross section and volute connection cross section. Here, the opened-up cross-sectional area is plotted upward, and the valve opening stroke of the linear valve is plotted toward the right.

The profile shown by dashed lines in FIG. 12 shows the volute connection cross section and illustrates that the volute connection cross section increases linearly with increasing opening of the linear valve 35 until the maximum opening cross section is reached, and then remains constant until the linear valve 35 is fully open.

The profile shown by a solid line in FIG. 12 shows the wastegate opening cross section and illustrates that the wastegate opening cross section is divided into three ranges. In the case of an only small opening stroke of the linear valve element 35a, as is present in a range 1, the linear valve 35 opens up a small wastegate opening cross section extremely quickly, which wastegate opening cross section is however larger than the opened-up area at the volute connection. In this range, the increase of the opened-up wastegate opening cross section takes place linearly. This configuration is advantageous in particular at low engine speeds and high engine loads. Here, only a small exhaust-gas mass flow is available to the turbine. The compressor must nevertheless provide high charge pressures, which requires a high turbine power. Owing to the almost complete volute separation, a high pressure can be built up upstream of the turbine despite low exhaust-gas flow rates. The energy required for the compressor can thus be provided. Furthermore, the volute separation at low engine speeds permits efficient operation of the internal combustion engine by means of optimum separation of the cylinders of the internal combustion engine and thus low residual gas fractions. If, for charge pressure control, the linear valve of the wastegate is opened further, then the volute separation is approximately maintained owing to the more dominant increase of the wastegate opening cross section in the range 1.

During the further opening of the linear valve 35, as is present in the range 2 in FIG. 12, the opened-up wastegate opening cross section is kept constant. This is advantageous in particular in the medium engine speed range and at high engine loads. Thus, the degree of the volute connection cross section can be optimally adapted to the engine requirements. Only when the volute connection cross section has been fully opened up, that is to say in the range 3 shown in FIG. 12, does a linear further increase of the wastegate opening cross section occur, until the linear valve 35 is fully open. This is advantageous in particular at high engine speeds and high engine loads. Owing to the high levels of power that must be converted in this case at the turbocharger, the greatest possible turbine efficiency is essential. This is made possible by means of the volute connection. It is thus possible for the greatest possible exhaust-gas mass flow to be conducted via the turbine without the exhaust-gas back pressure upstream of the turbine exceeding the admissible limits. The adjustment of the turbine power may be realized in the familiar manner by means of the wastegate valve, because the volute connection cross section no longer changes in this range.

Figure 13:
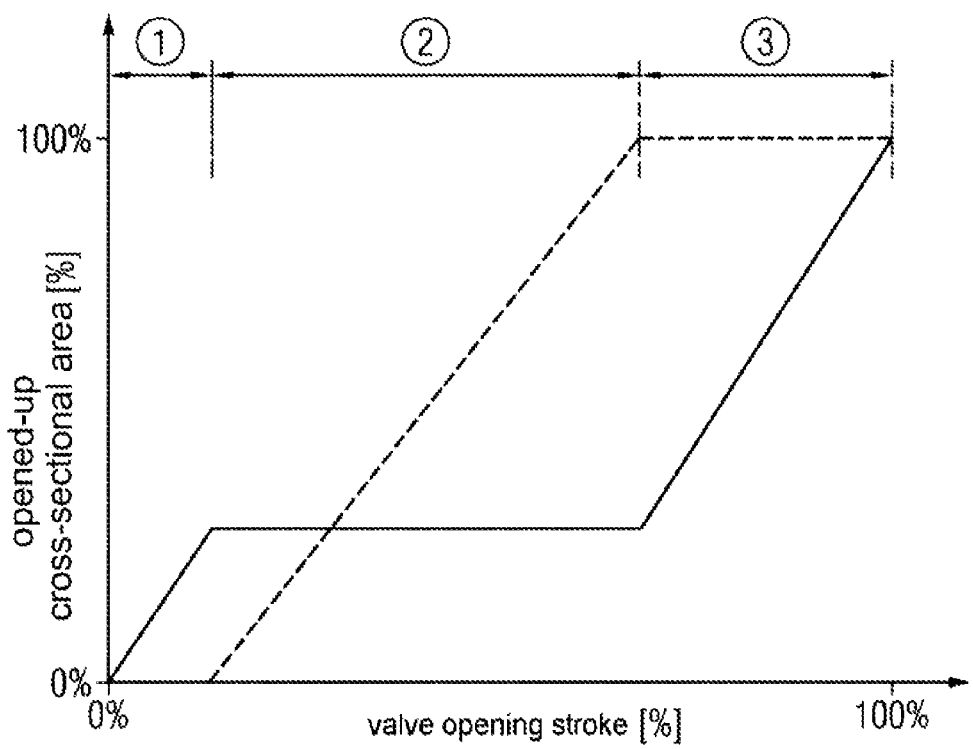
FIG. 13 shows a diagram for illustrating a second example of a preferred cross-sectional area profile of wastegate opening cross section and volute connection cross section.

FIG. 13 shows a diagram for illustrating a second example of a preferred cross-sectional area profile of wastegate opening cross section and volute connection cross section.

It is also the case in this second example that the opened-up cross-sectional area is plotted upward, and the valve opening stroke of the linear valve element 35a is plotted toward the right.

The profile shown by dashed lines in FIG. 13 illustrates that the volute connection cross section is opened up only after a delay, then increases linearly with increasing opening of the linear valve 35 until the maximum volute connection cross section is reached, and finally remains constant until the linear valve 35 is fully open.

The profile shown by a solid line in FIG. 13 illustrates that the wastegate opening cross section corresponds to the profile shown in FIG. 12. It is divided into three ranges. In the case of an only small opening of the linear valve 35, as is present in the range 1, the linear valve 35 opens up a small wastegate opening cross section extremely quickly, wherein, in this case, the increase of the opened-up wastegate opening cross section takes place linearly.

This configuration is advantageous in particular at low engine speeds and high engine loads. Here, only a small exhaust-gas mass flow is available to the turbine. The compressor must nevertheless provide high charge pressures, which requires a high turbine power. Owing to the complete volute separation, a high pressure can be built up upstream of the turbine despite low exhaust-gas flow rates. The energy required for the compressor can thus be provided. Furthermore, the complete volute separation at low engine speeds permits efficient operation of the internal combustion engine by means of optimum separation of the cylinders of the internal combustion engine and thus low residual gas fractions. If, for charge pressure control, the linear valve 35 of the wastegate valve is opened further, the volute separation is maintained owing to the delayed increase of the volute connection cross section in the range 1.

During the further opening of the linear valve 35, as is present in the range 2 in FIG. 13, the opened-up wastegate opening cross section is kept constant. This is advantageous in particular in the medium engine speed range and at high engine loads. Thus, the degree of the volute connection can be optimally adapted to the engine requirements.

Only when the volute connection cross section has been fully opened up, that is to say in the range 3 shown in FIG. 13, does a linear further increase of the wastegate opening cross section occur, until the linear valve 35 is fully open.

As already discussed with regard to FIG. 12, this is advantageous in particular at high engine speeds and high engine loads.

To permit a cross-sectional area profile as illustrated in FIG. 13, a modification of the cylindrical valve body 36 shown in FIGS. 10 and 11 is preferably implemented.

A correspondingly designed turbine is characterized in that the continuous increase of the volute connection cross section begins only after a predefined valve opening stroke VH has been traveled through, that is to say begins with a delay in relation to the opening of the wastegate opening cross section.

Figure 17:
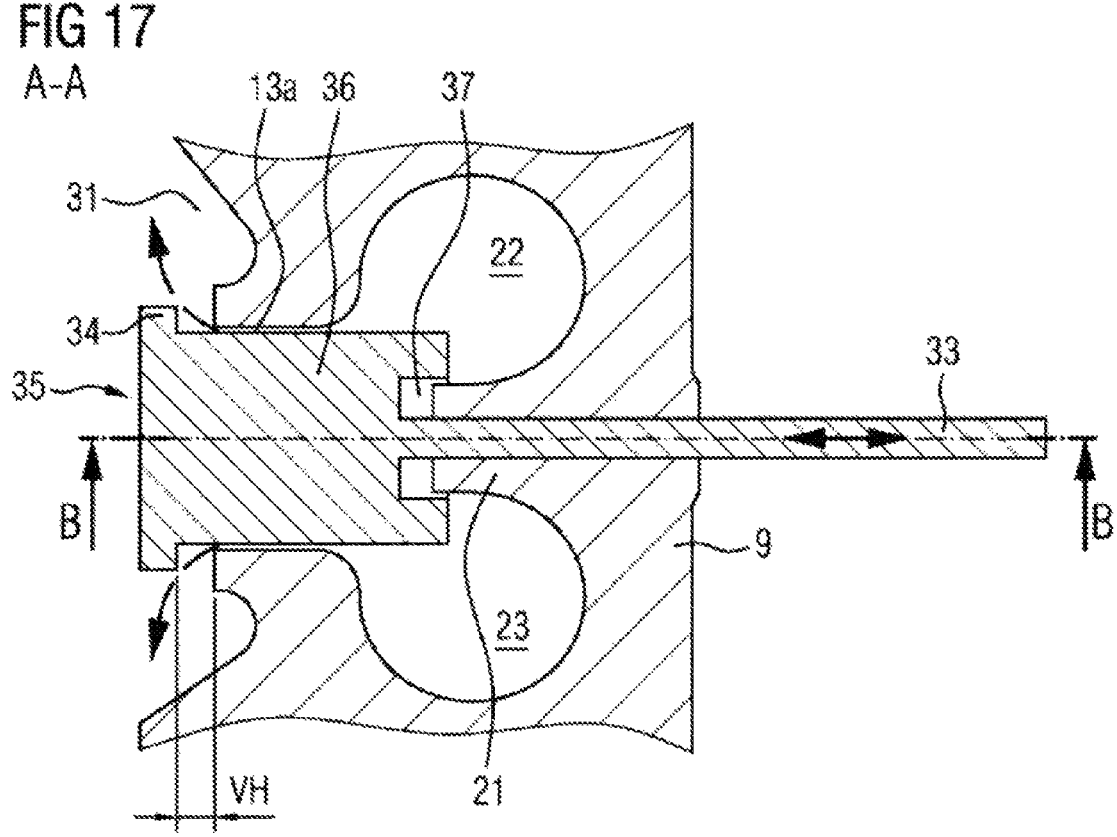
FIG. 17 shows a sectional illustration for illustrating a third exemplary embodiment of the invention.

This is shown in FIG. 17, which discloses a sectional illustration, as in FIG. 10, for illustrating a further exemplary embodiment of the invention. In this exemplary embodiment, the valve body 36 has, in its end region facing toward the separating wall 21, a groove-like recess 37 into which, in the closed position of the linear valve, the separating wall 21 engages such that, over a limited stroke range of the linear valve element, the separating wall 21 overlaps the groove-like recess 37 such that, during the opening of the linear valve, the volute connection cross section is opened up only after a predefined valve opening stroke VH has been overshot, that is to say in a delayed manner in relation to the opening of the wastegate opening cross section, and is increased in continuous fashion.

Figure 14:
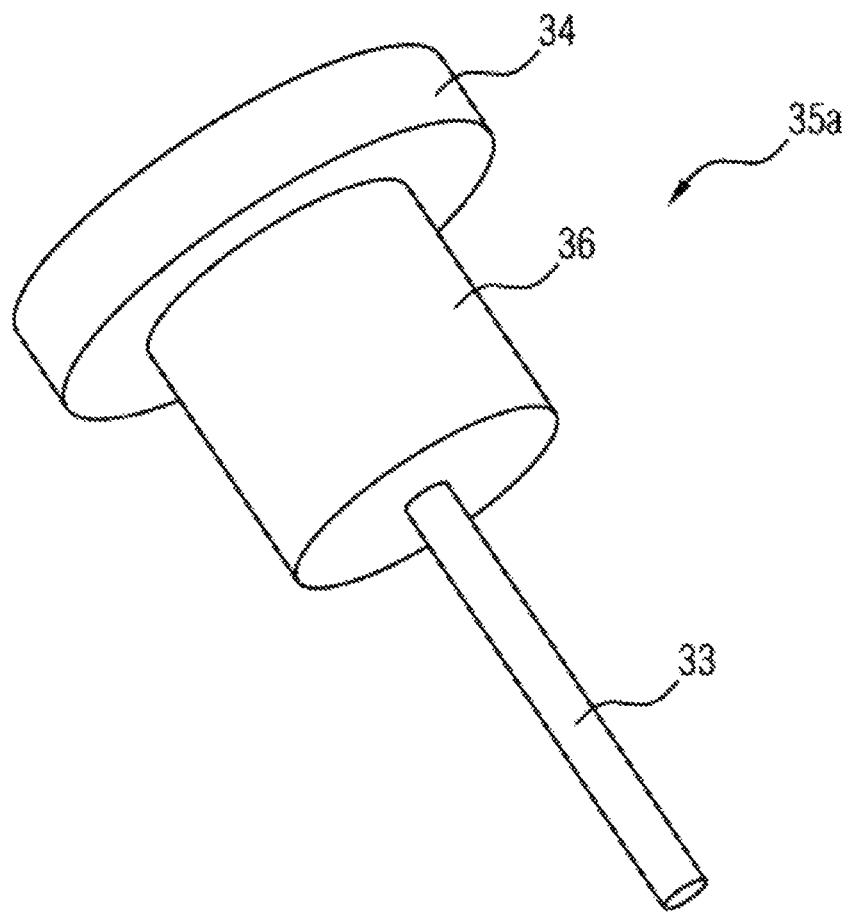
FIG. 14 shows a perspective illustration of a linear valve element as per FIGS. 10 and 11.

FIG. 14 shows a perspective illustration of a linear valve element 35a by means of which the profile of the opened-up opening cross sections illustrated in FIG. 12 can be realized. The linear valve element 35a substantially corresponds to the linear valve element 35a shown in FIG. 10. It has a displacement shaft 33, a cylindrical valve body 36 and a valve disk 34.

Figure 15:
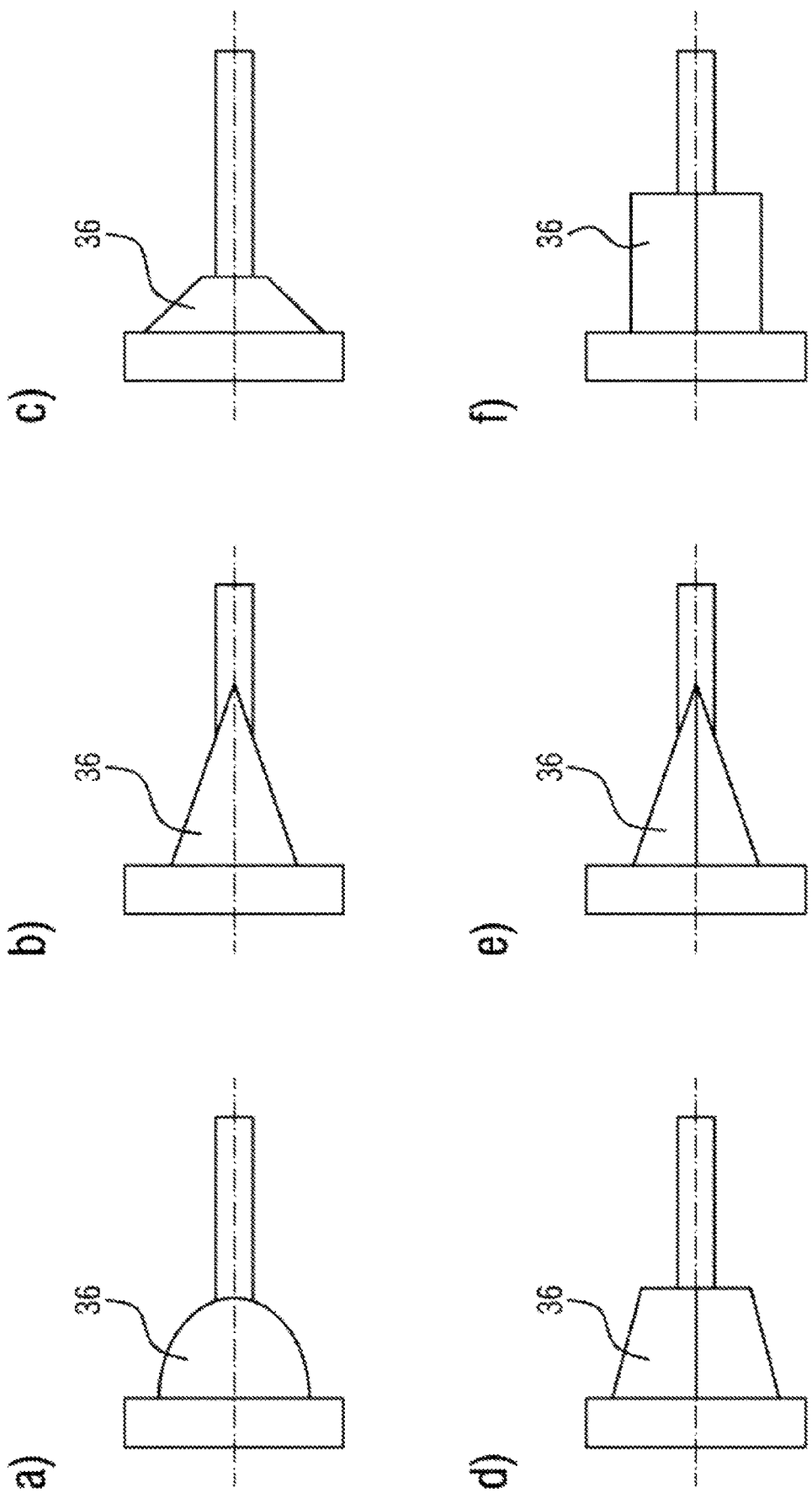
FIG. 15 shows examples of different geometries of a valve body of a linear valve element.

FIG. 15 shows further examples of linear valve elements by means of which similar opening profiles or even different opening profiles in relation to those shown in FIG. 12 can be realized. In these further examples, the valve body 36 is of different form to the exemplary embodiment shown in FIG. 14. FIG. 15a shows a linear valve element in the case of which the valve body 36 is formed with an elliptical cross section. FIG. 15b shows a linear valve element in the case of which the valve body 36 is of conical form. FIG. 15c shows a linear valve element in the case of which the valve body 36 is of frustoconical form. FIG. 15d shows a linear valve element in the case of which the valve body 36 is of truncated-pyramid-shaped form. FIG. 15e shows a linear valve element in the case of which the valve body 36 is of pyramid-shaped form. FIG. 15f shows a linear valve element in the case of which the valve body 36 is of cuboidal form.

Figure 16:
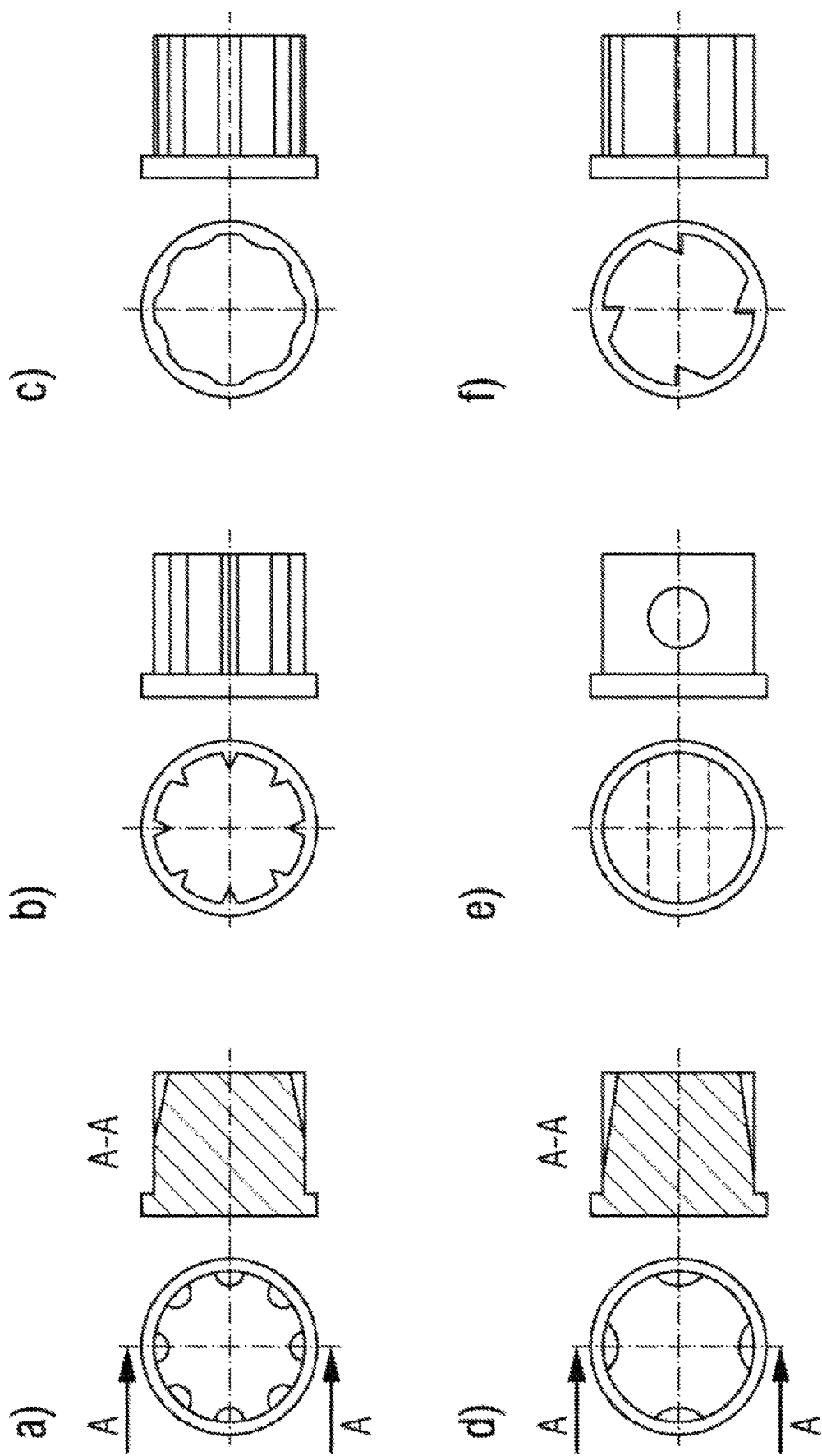
FIG. 16 shows examples of valve bodies, modified at their outer contour, of a linear valve element.

FIG. 16 shows examples of modified linear valve elements in the case of which the respective valve body 36 has small modifications to the outer circumference for the purposes of fine adjustment of the throughflow characteristic. These modifications serve for enlarging or adapting the opened-up cross-sectional area between valve body and wastegate opening in the opening range 2, indicated in FIGS. 12 and 13, of the linear valve.

FIG. 16a illustrates modifications in the form of semicircular notches which run in the axial direction and which are distributed over the circumference of the valve body 36. FIG. 16b shows modifications in the form of wedge-shaped notches which run in the axial direction and which are distributed over the circumference of the valve body 36. FIG. 16c shows modifications in the form of arcuate milled-out portions which run in the axial direction and which are distributed over the circumference of the valve body 36. FIG. 16d shows modifications in the form of semi-elliptical recesses which run in the axial direction and which are distributed over the circumference of the valve body 36. FIG. 16e shows modifications in the case of which the valve body is formed as a hollow cylinder and is equipped with a passage bore running perpendicular to the valve body axis. FIG. 16f shows modifications in the form of sawtooth-shaped notches which run in the axial direction and which are distributed over the circumference of the valve body 36.

The modifications of the valve body as per FIGS. 16 a), b), c), d) and f) may extend to the same depth over the entire axial length, or only a part of the axial length, of the valve body. Modifications with notches, recesses or milled-out portions whose depth changes over the axial extent may also be provided.

Figure 18:
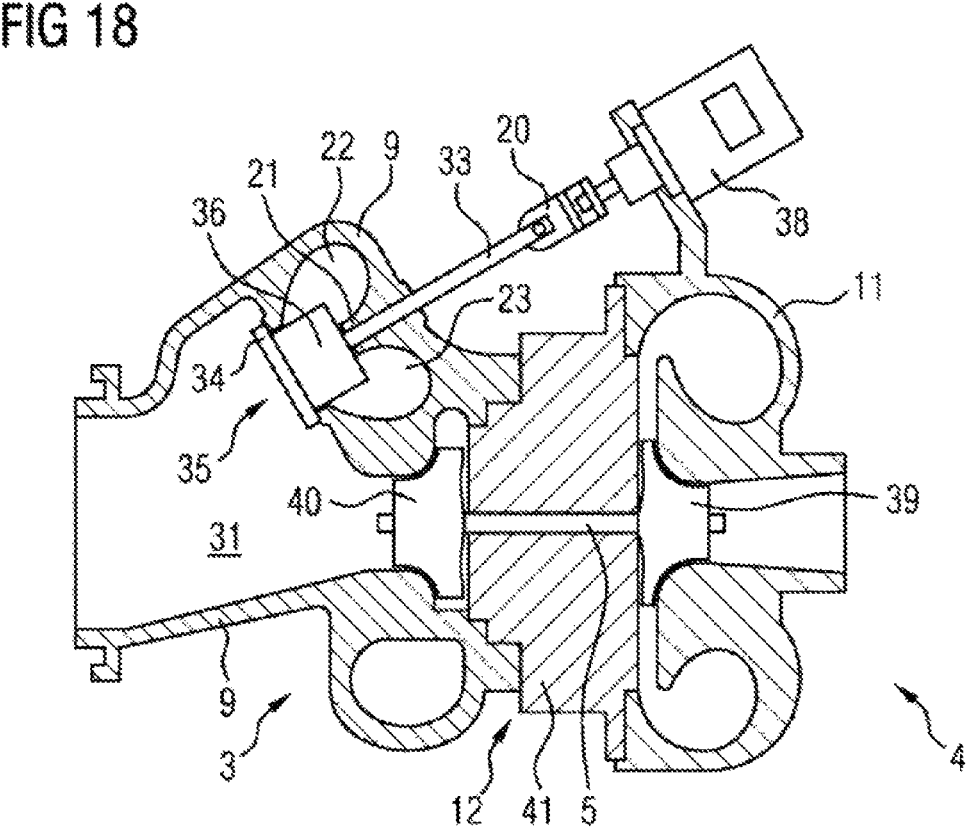
FIG. 18 shows a sectional illustration for illustrating an overall construction of an exemplary embodiment with a wastegate valve designed as a linear valve.

The adjustment, required for a variation of the opening position of the linear valve 35, of the displacement shaft 33 is realized for example using a linear actuator 38 and a compensation joint 20. This is illustrated in FIG. 18. This figure shows a simplified sectional illustration through an exhaust-gas turbocharger having a wastegate valve according to the invention designed as a linear valve 35 for the purposes of illustrating an exemplary embodiment for the actuation of the linear valve 35.

From this sectional illustration, it can be seen that, in the turbine housing 9, there are provided two volutes 22 and 23 which are fluidically separated from one another by means of a separating wall 21 and a linear valve 35. The linear valve 35 has a valve disk 34, a valve body 36 and a displacement shaft 33. The linear valve element 35a is, at its displacement shaft 33, connected by means of a compensation joint 20 to a linear actuator 38, which moves the displacement shaft 33 in its longitudinal direction via the compensation joint 20. The linear actuator 38 is fastened to the compressor housing 11 of the exhaust-gas turbocharger, within which the compressor impeller 39 is arranged. The latter is connected via the shaft 5 to the turbine impeller 40. The shaft 5 is mounted in a bearing housing 41. A linear actuator is, like the abovementioned linear valve, in particular characterized in that it performs a rectilinear translational actuating movement.

FIG. 19 shows a sectional illustration perpendicular to the profile of the volutes 22 and 23 and of the separating wall 21 through a linear valve for controlling the volute connection cross section and the wastegate opening cross section, for the purposes of illustrating a further exemplary embodiment of the invention. FIG. 20 shows a sectional illustration of said exemplary embodiment along the section line B-B shown in FIG. 19, that is to say in the direction of the volute and separating wall profile. Furthermore, FIG. 21 shows a perspective illustration of the linear valve body 35a discussed on the basis of FIGS. 19 and 20.

In this exemplary embodiment, the turbine is accordingly characterized in that the linear valve element 35a has at least one valve disk 34 which, in order to close the wastegate opening 13 by sealed abutment of the valve disk 34 on a valve seat 34a enclosing the wastegate opening 13, and has a displacement shaft 33 for actuating the linear valve element 35a by axial displacement. Furthermore, here, the wastegate opening 13 opens into an outlet funnel 31a formed in the outlet chamber 31, which outlet funnel adjoins the valve seat 34a, wherein a wastegate opening cross section is predefined by a funnel gap 44 between the outer edge of the valve disk 34 and the wall of the outlet funnel 31 of the wastegate valve 32 in the turbine housing 9.

In a further configuration of the exemplary embodiment mentioned above, the turbine is characterized in that the linear valve element 35a has a valve body which is arranged between the valve disk 34 and the displacement shaft 33 and which is designed as a slide plate 36a and which is guided in a corresponding groove-like or pocket-like slide recess 45 in the separating wall 21 provided between the two volutes 22 and 23, wherein the separating wall 21 has, in the region of the slide recess 45, a passage recess 42 which extends through the separating wall 21 perpendicularly with respect to the separating wall plane and which, in a first valve position, is closed off by the slide plate 36a of the linear valve element 35a, wherein the passage recess 42 is, in the case of a progressive valve opening stroke VH of the linear valve element 35a, opened up by the slide plate 36a with a volute connection cross section which increases in a manner dependent on the valve opening stroke VH.

Figure 21:
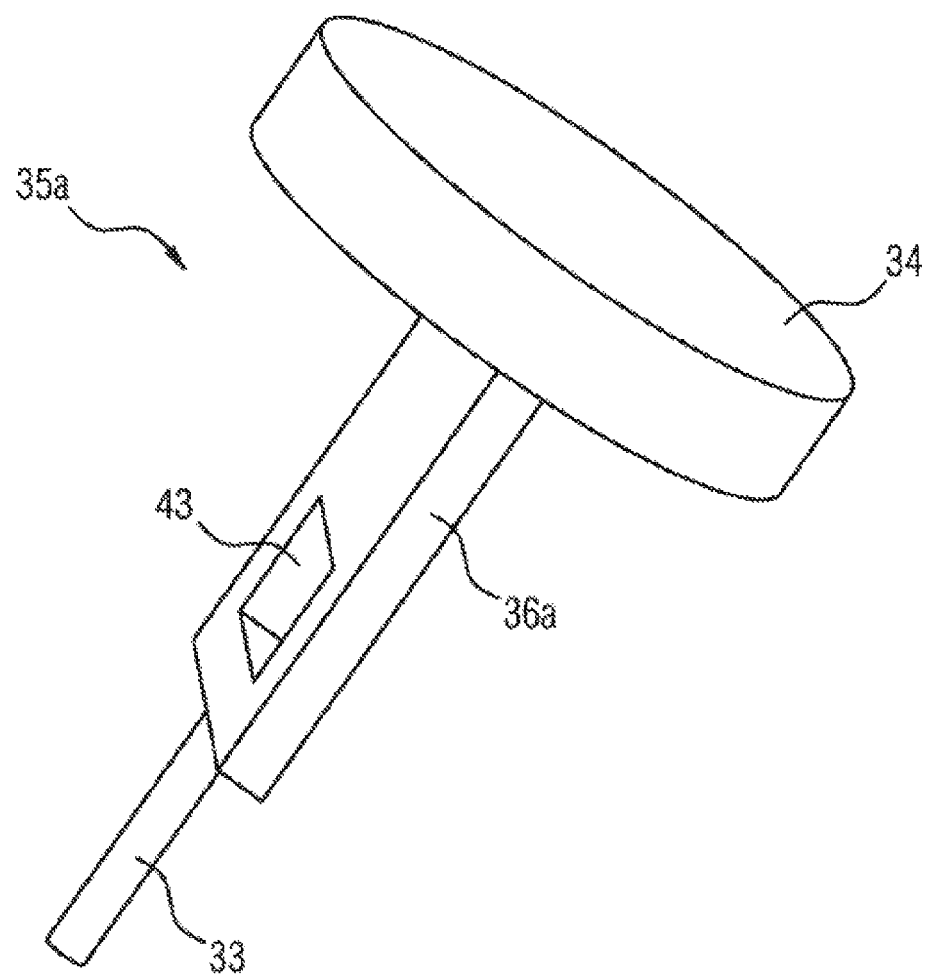
FIG. 21 shows a perspective illustration of a further linear valve element.

FIGS. 19, 20 and 21 show one possible physical design of the stated exemplary embodiment, to which that exemplary embodiment is however not restricted. Considering FIGS. 19, 20 and 21 in combination, it is possible to see in particular the design of the valve body as a flat slide plate 36a and the arrangement of the passage recesses 42 and 43 in the slide plate 36a and the separating wall 21.

It can also be seen that the linear valve 35 has a valve disk 34, realized as a circular flap disk, for sealing abutment on a valve seat 34, and has a displacement shaft 33.

The separating wall 21 provided between the two volutes 22 and 23 has a groove-like or pocket-like slide recess 45 and a passage recess 42, which in this case is illustrated as being rectangular and which extends through the separating wall in the region of the slide recess perpendicularly to the separating wall plane.

The slide plate 36a likewise has a passage recess 43, which in this case is illustrated as being rectangular and which extends through the slide plate 36a perpendicularly to the slide plate plane. The slide plate 36a is furthermore connected to or formed in one piece with the displacement shaft 33.

Instead of a passage recess 43 of said type in the slide plate 36a, the slide plate may for example also simply be of shortened form, with a correspondingly lengthened displacement shaft 33. However, the slide plate 36a must only be shortened to such an extent that, in the closed state of the linear valve 35, the passage recess 42 in the separating wall 21 is completely covered, that is to say closed.

The valve body 36 formed as a slide plate is guided in a corresponding groove-like or pocket-like slide recess 45 in the separating wall 21. The positioning of the passage recess 43 in the slide plate 36a and the positioning of the passage recess 42 in the separating wall 21 in the region of the groove-like or pocket-like slide recess 45 are selected such that, when the linear valve 35 is closed, the passage recess 43 in the slide plate 36a is covered by the separating wall 21, and the passage recess 42 in the separating wall 21 is closed by the slide plate 36a, and the wastegate opening 13 is closed by the valve disk 34.

A linear movement of the linear valve element 35a by means of the displacement shaft 33 in an opening direction causes the valve disk 34 together with the slide plate 36a to be displaced linearly such that the passage recess 43 in the slide plate 36a increasingly overlaps the passage recess 42 in the separating wall 21 and thus opens up a volute connection cross section, such that the two volutes 22 and 23 are fluidically connected to one another.

At the same time, the valve disk 34 is lifted off from the valve seat 34a, and a wastegate opening cross section is opened up which is predefined substantially by the funnel gap 44 between the outer edge of the valve disk 34 and the outlet funnel 31a of the wastegate valve.

The area profile of the volute connection in relation to the valve opening stroke of the linear valve element 35a may in this case be configured as desired by means of the form and dimensioning of the passage recesses 42 and 43 in the slide plate 36a and the separating wall 21.

FIG. 22 shows illustrations for illustrating the opening profile of the volute connection cross section in dependence on the valve opening stroke of the linear valve 35. It can be seen that, during an opening of the volute connection by overlapping of the passage recesses 42 and 43, the opened volute connection cross section initially increases linearly, as illustrated by means of a dashed line in the range d of the valve opening stroke in the left-hand diagram of FIG. 22. In the range e shown in FIG. 22, the cross-sectional area of the volute connection remains constant until the linear valve is fully open, because, in this range, the maximum opening of the passage recess 42 in the separating wall 21 remains opened up. It is also illustrated in FIG. 22 that, in this exemplary embodiment, the following relationship applies for the opened volute connection cross section f in the case of a rectangular design of the passage recesses 42 and 43:

$$f = g \times h,$$

wherein g is the width of the passage recesses 42 and 43, and h is the opening height, opened up by the passage recess 43 of the slide plate 36a, of the passage recesses 42.

Figure 23:
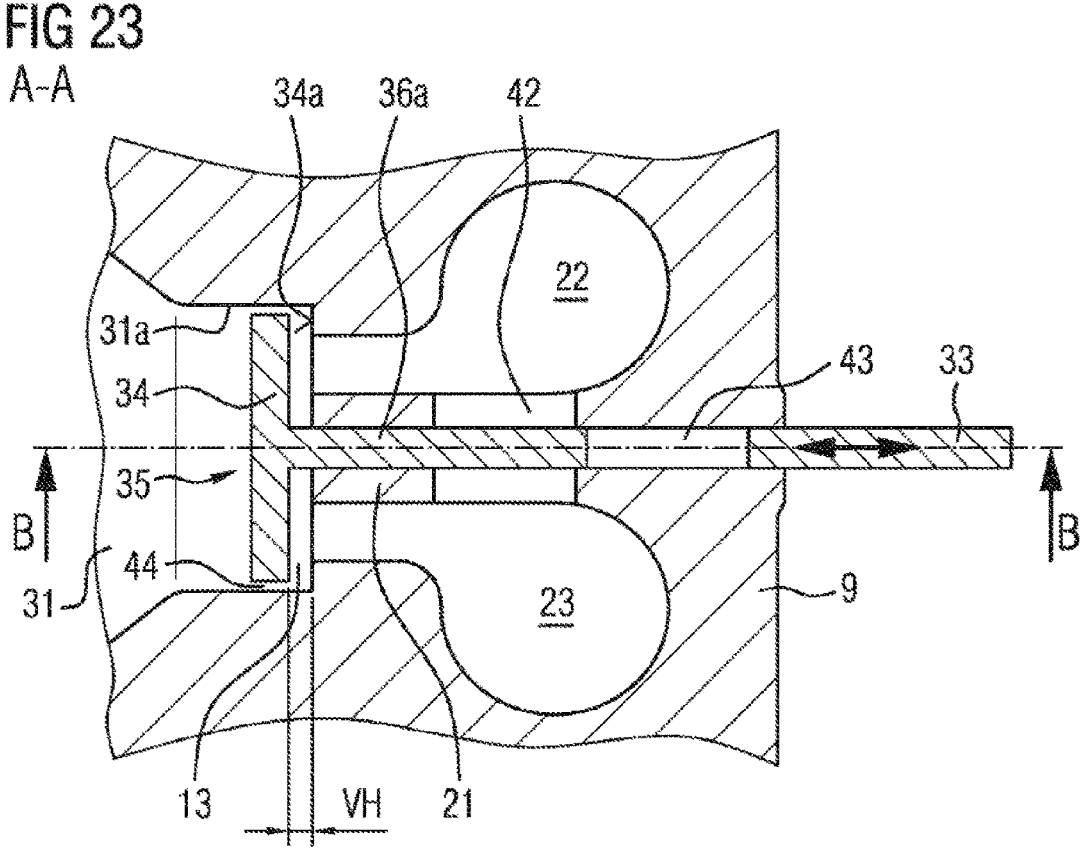
FIG. 23 shows a sectional illustration for illustrating a fifth exemplary embodiment of the invention.

FIG. 23 shows a sectional illustration for illustrating a further exemplary embodiment of the invention, which constitutes a modification of the example shown in FIGS. 19 and 20. In this exemplary embodiment, the arrangement and dimensioning of the passage recesses 42 and 43 have been selected such that, with progressive opening of the linear valve 35 from the closed state, firstly the valve disk 34 opens up the wastegate opening, and such that the opening of the volute connection cross section takes place with a delay. To achieve this, the passage recess 43 provided in the slide plate 36a must be arranged in the slide plate 36a such that, proceeding from the closed position of the linear valve, the displacement shaft 33 and the slide plate 36a must first be displaced by a predefined valve opening stroke (VH) before a volute connection cross section is opened up with a delay in relation to the opening of the wastegate opening cross section.

Figure 24:
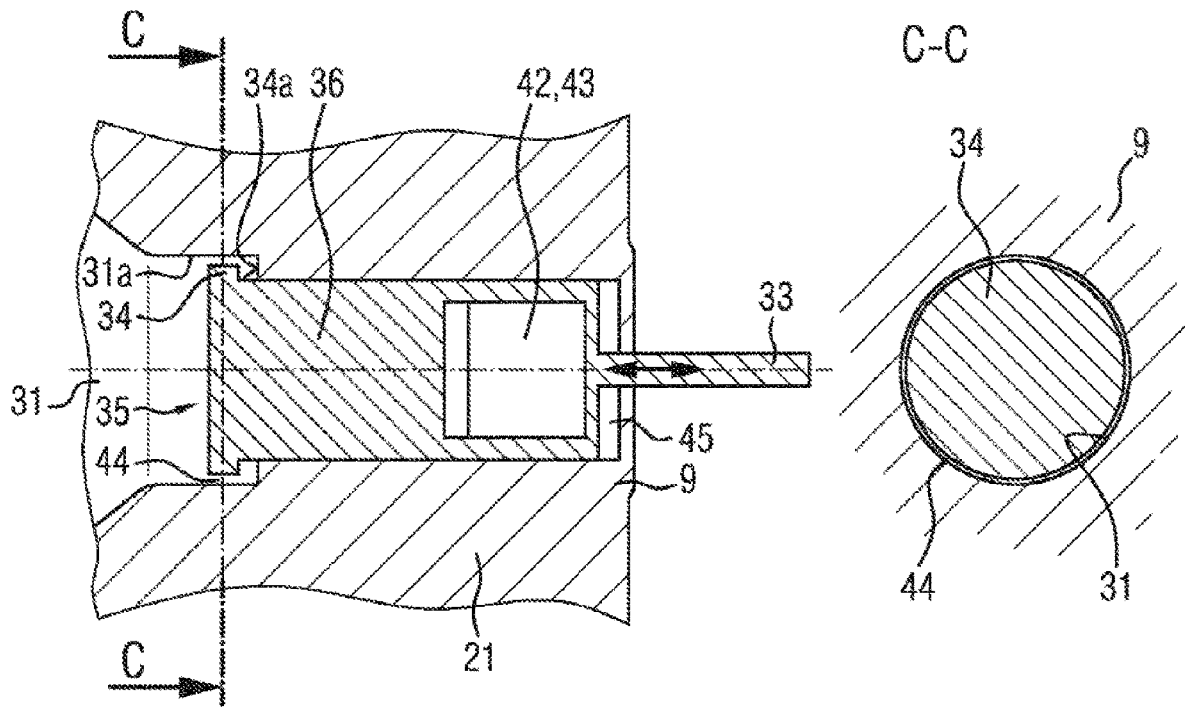
FIG. 24 shows a sectional illustration for illustrating a sixth exemplary embodiment of the invention.

FIG. 24 shows a sectional illustration for illustrating a further exemplary embodiment of the invention, which may be used in particular in combination with, or as a modification of, the two preceding exemplary embodiments. In this exemplary embodiment, for the purposes of a targeted configuration of the wastegate mass flow in dependence on the valve opening stroke, a particular, suitably dimensioned funnel gap 44, which possibly varies in a manner dependent on the valve opening stroke, is provided between the outer edge of the valve disk 34 and the adjacent housing wall of an outlet funnel 31a of the wastegate valve in the turbine housing 9. In this way, as shown in this example, the wastegate opening cross section can be kept at a constant level over a relatively large valve opening stroke of the linear valve 35, because the funnel gap 44 between the outer edge of the valve disk 34 and the adjacent funnel wall initially does not change. Only after an adequately large valve opening stroke has been reached does the funnel gap 44, owing to a conical widening of the outlet funnel 31a of the wastegate valve in this region, become larger with increasing valve opening stroke, which results in an increase of the wastegate opening cross section.

Figure 25:
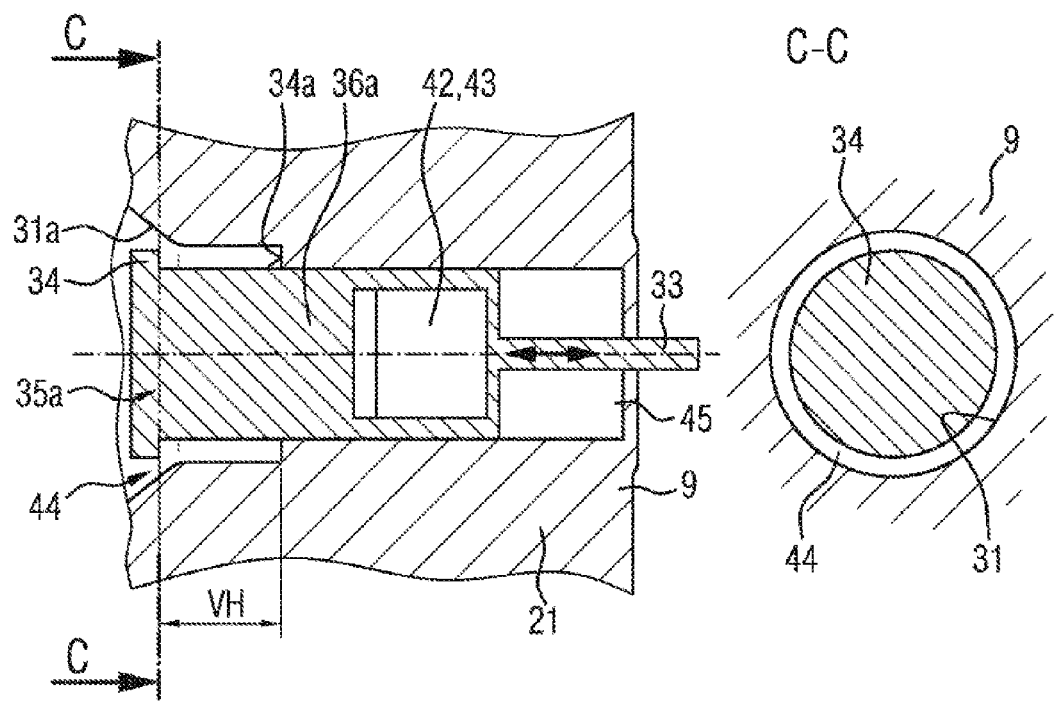
FIG. 25 shows a sectional illustration for illustrating the sixth exemplary embodiment, with the linear valve having been opened further.

This increase of the wastegate opening cross section is illustrated in FIG. 25, in which the linear valve element 35a is illustrated on the left-hand side, which has been displaced further to the left, in the opening direction, in relation to FIG. 24. It can also be seen from FIG. 25 that the funnel gap 44 between the radial outer edge of the valve disk 34 and the adjacent outlet funnel wall becomes increasingly larger owing to the conical design, provided in this region of the turbine housing, of the outlet funnel 31a of the wastegate valve.

Figure 26:
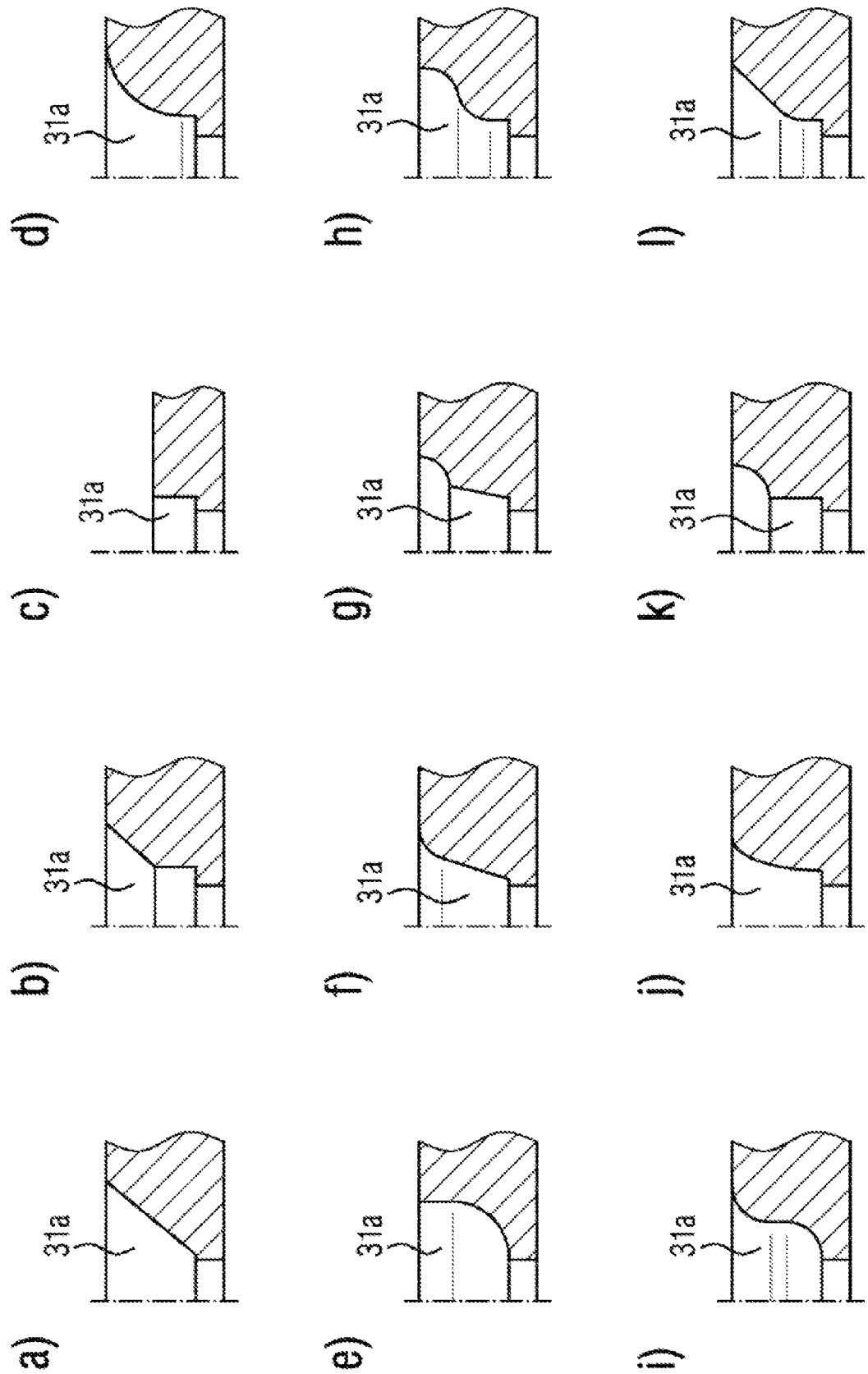
FIG. 26 shows illustrations for illustrating various contours in the region of the outlet funnel of the wastegate valve.

FIG. 26 shows exemplary illustrations for illustrating different contours of the funnel shell of the outlet funnel 31a of the wastegate valve, which show different design variants of the above-stated exemplary embodiments.

The corresponding design variants are characterized in that the shape of the outlet funnel 31a is defined by a circular or a triangular or a rectangular or a polygonal outline paired with a contour of the funnel shell surfaces in the form of a cone geometry or a cylinder geometry or a circularly, parabolically or hyperbolically widening geometry or by combinations of two or three of the above-stated geometrical contours, such that the wastegate opening cross section is dependent on the valve opening stroke VH in combination with the predefined form of the outlet funnel 31a.

Here, FIG. 26 illustrates the respective outlet funnel 31a in each case in a half section based on a rotationally symmetrical design, that is to say a circular outline. It is self-evidently possible, depending on or in correlation with the circumferential geometry of the valve disk, for the respective outlet funnel 31a to also have a triangular, rectangular or polygonal outline paired with the contours of the funnel shell surfaces qualitatively illustrated in FIG. 26.

FIGS. 26 a) to 26 l) show alternative contours of the funnel shell surfaces from a simple conical geometry (FIG. 26 a) and a cylinder geometry (FIG. 26 c), via a circularly, parabolically or hyperbolically widening geometry (FIGS. 26 d), 26 e), 26 f)) to combinations of two or three of the above-stated geometries (FIGS. 26 g) to 26 l)). Furthermore, further combinations are possible which may be configured in accordance with the desired profile of the wastegate opening cross section in dependence on the valve opening stroke.

In the case of all of these contours, a further opening of the linear valve is associated with an enlargement of the wastegate opening cross section, in the case of which the gap between the valve disk outer edge and the wall of the outlet funnel can be set in dependence on the valve opening stroke in a desired manner.

Figure 27:
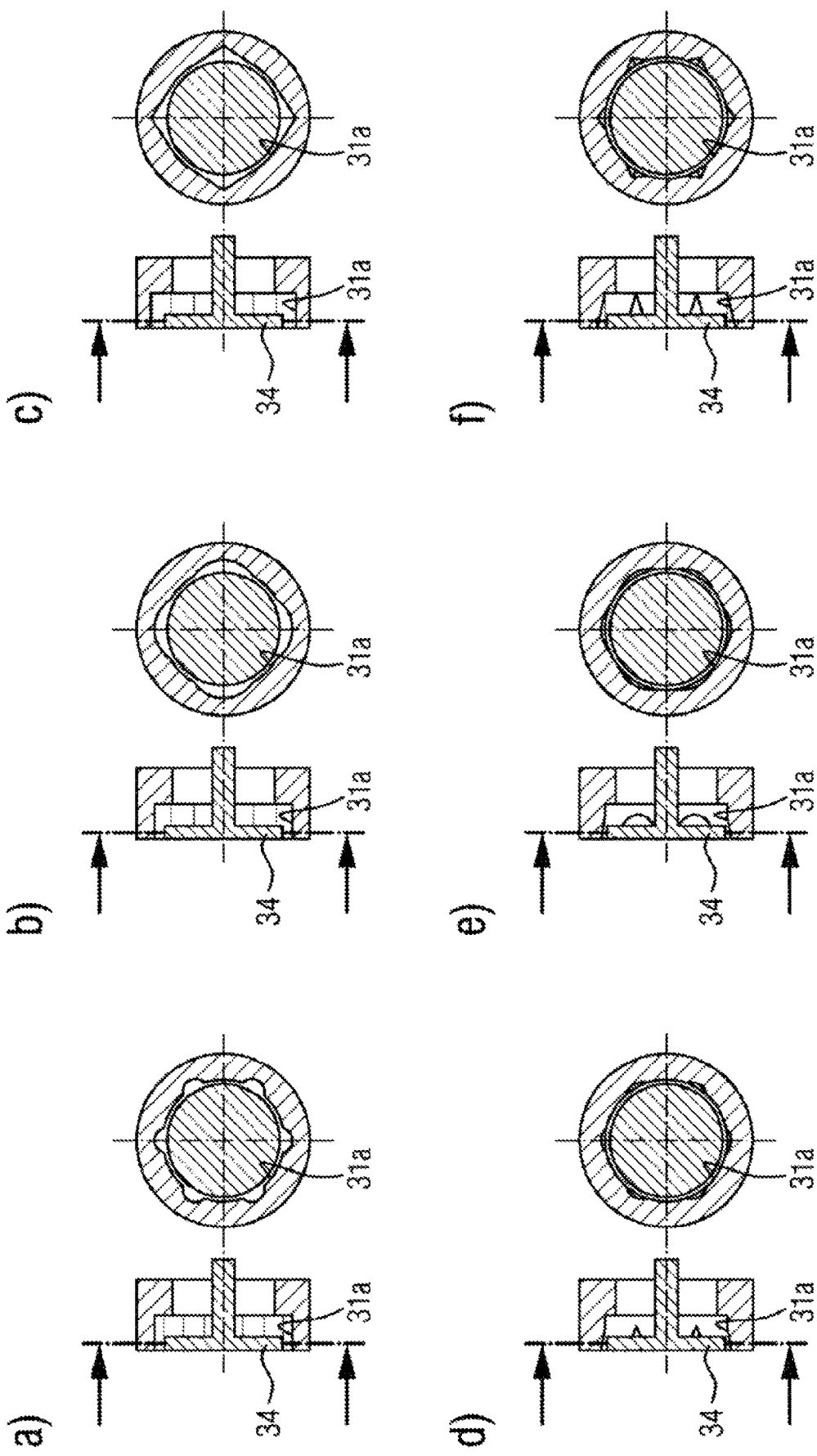
FIG. 27 shows examples of modified contours of the turbine housing in the region of the outlet funnel of the wastegate valve.

FIG. 27 shows further examples for the modification of the shell contours of the outlet funnel 31a of the wastegate valve in the turbine housing. In the examples shown in FIGS. 27 a) to 27 f), the geometry of the respective outlet funnel 31a is based in each case on a circular outline and a cylindrical contour. The modifications consist here in the arrangement of notches, grooves or protuberances which run in the axial direction of the outlet funnel 31a and which are distributed over the circumference of the outlet funnel 31a and which have different geometries and forms. For example, the cross section of the notches, grooves or protuberances may be of semicircular, semi-elliptical, V-shaped or rectangular form. Here, the depth and/or width of the notches, grooves or protuberances may be of constant form over the axial profile thereof, or may vary in continuous or stepped fashion over the axial profile. These modifications serve for increasing or adapting the cross-sectional area that is opened up, at a predefined valve opening stroke, between the outer circumference of the valve disk 34 and the wall of the outlet funnel 31a of the wastegate valve.

In conclusion, the invention described above provides a turbine for an exhaust-gas turbocharger which has two volutes through which an exhaust gas can flow and between which a separating wall is provided. Furthermore, a wastegate valve designed as a linear valve is provided, which has a linear valve element with a displacement shaft, wherein the linear valve element and the displacement shaft are guided through the separating wall provided between the volutes. Here, the linear valve element is guided centrally in relation to a wastegate opening of the turbine housing and is guided from the direction of the outlet chamber toward a valve seat, and can be lifted off from the valve seat in the axial direction of the shaft longitudinal axis into the outlet chamber by means of the displacement shaft in order to open the wastegate outlets. In an advantageous further embodiment, the linear valve element is provided for opening up or shutting off the wastegate opening and a volute connection between the two volutes. Here, one advantageous embodiment consists in a valve body being provided and designed such that a wastegate opening cross section is firstly opened up without initially opening the volute connection. Only with a further increase of the valve opening stroke of the linear valve element, that is to say a further opening of the linear valve, is the volute connection cross section also increasingly opened up.

The use of a linear valve gives rise to advantages, which consist in reduced costs owing to the use of fewer individual parts and fewer joining processes, a reduced structural space requirement, a greater degree of freedom with regard to the design of the valve body, and a design which is less susceptible to wear owing to smaller degrees of play.

The invention claimed is:

1. A turbine for an exhaust-gas turbocharger, the turbine comprising:
    a turbine housing having two volutes for an exhaust gas flow and a separating wall between said two volutes;
    a single wastegate valve for said two volutes, wherein said single wastegate valve is a linear valve with a linear valve element for selectively opening and closing wastegate outlets of said two volutes in a direction of a common outlet chamber arranged outside said two volutes; and
    a displacement shaft for actuating said linear valve element connected to said linear valve element, said displacement shaft having a shaft longitudinal axis and extending out of said turbine housing through said separating wall in a direction of a separating wall plane spanned by said separating wall, and being movably guided along said shaft longitudinal axis in said separating wall;
    wherein said linear valve element, in order to close said wastegate outlets, is guided away from the common outlet chamber toward a valve seat and, in order to open said wastegate outlets, is lifted off from said valve seat in a direction of said shaft longitudinal axis into said common outlet chamber by said displacement shaft.

2. The turbine according to claim 1, wherein said single wastegate valve has a wastegate opening, wherein said wastegate outlets of said two volutes transition into said wastegate opening, and wherein said wastegate opening is closed in a first valve position by said linear valve element and is open at least in a second valve position of said linear valve element.

3. The turbine according to claim 2, wherein said linear valve element, in the first valve position, keeps said two volutes fluidically separate from one another, and said linear valve element has at least one further valve position, in which a fluidic connection between said two volutes is opened up by said linear valve element.

4. The turbine according to claim 2, wherein said linear valve element has a valve disk which, in order to close said wastegate opening by sealed abutment of said valve disk on the valve seat surrounding said wastegate opening, is guided away from said outlet chamber toward said valve seat.

5. The turbine according to claim 4, wherein said linear valve element comprises a valve body disposed between said valve disk and said displacement shaft and arranged in a separating wall recess of said separating wall and also arranged centrally in said wastegate opening of said turbine housing, wherein a wastegate opening cross section is defined by a valve gap formed between an outer circumference of said valve body and an inner circumference of said wastegate opening, and wherein a volute connection cross section is defined by an opening-up of said separating wall recess by said valve body, said opening-up being dependent on a valve opening stroke.

6. The turbine according to claim 5, wherein said valve body has a geometric shape selected from the group consisting of cylindrical, elliptical, conical, frustoconical, pyramid-shaped, truncated-pyramid-shaped, and cuboidal, or a combination of at least two geometric shapes thereof.

7. The turbine according to claim 5, wherein said valve body is configured such that, proceeding from a first, closed valve position of said linear valve element and with a continuously increasing valve opening stroke of said linear valve element due to an axial displacement of said displacement shaft, the wastegate opening cross section is initially increased linearly, is then kept constant over a certain extent of the valve opening stroke, and is then linearly increased again, until a valve end position is reached.

8. The turbine according to claim 7, wherein the continuous increase of the volute connection cross section begins only after a predefined valve opening stroke has been traveled through and thus begins with a delay relative to the opening of the wastegate opening cross section.

9. The turbine according to claim 5, wherein said valve body is configured such that, proceeding from a first, closed valve position of said linear valve element and with a continuously increasing valve opening stroke of said linear valve element due to an axial displacement of said displacement shaft, the volute connection cross section is increased continuously throughout until a maximum volute connection cross section is reached, and subsequently remains constant until a valve end position is reached.

10. The turbine according to claim 9, wherein the continuous increase of the volute connection cross section begins only after a predefined valve opening stroke has been traveled through and thus begins with a delay relative to the opening of the wastegate opening cross section.

11. The turbine according to claim 4, wherein said wastegate opening of said single wastegate valve is formed with said valve seat for a sealed abutment of said valve disk and is configured to open into an outlet funnel formed in the outlet chamber, said outlet funnel adjoining said valve seat, and wherein a wastegate opening cross section is predefined by a funnel gap between an outer edge of said valve disk and a wall of said outlet funnel of said single wastegate valve in said turbine housing.

12. The turbine according to claim 11, wherein said linear valve element comprises a valve body arranged between said valve disk and said displacement shaft and configured as a slide plate and which is guided in a corresponding groove-shaped or pocket-shaped slide recess formed in said separating wall between said two volutes, wherein said separating wall has, in a region of said slide recess, a passage recess which extends through said separating wall perpendicularly to the separating wall plane and which, in a first valve position, is closed off by said slide plate of said linear valve element, and wherein said passage recess, on occasion of a progressive valve opening stroke of said linear valve element, is opened up by said slide plate with a volute connection cross section that increases in dependence on the valve opening stroke.

13. The turbine according to claim 11, wherein a shape of said outlet funnel is defined by an outline selected from the group consisting of circular, triangular, rectangular and polygonal outline paired with a contour of funnel shell surfaces formed with a geometry selected from the group consisting of a cone geometry, a cylinder geometry, a circularly widening geometry, a parabolically widening geometry, and a hyperbolically widening geometry or by combinations of two or three of said contour geometries, such that the wastegate opening cross section is dependent on the valve opening stroke in combination with a predefined shape of said outlet funnel.

14. The turbine according to claim 1, further comprising a compensation joint connecting said linear valve element to a linear actuator.

* * * * *